US008191078B1

(12) United States Patent
Cullen et al.

(10) Patent No.: US 8,191,078 B1
(45) Date of Patent: May 29, 2012

(54) FAULT-TOLERANT MESSAGING SYSTEM AND METHODS

(75) Inventors: William M. Cullen, Cambridge, MA (US); Peter S. Easton, Winchester, MA (US); Ling-Yun Yin, Acton, MA (US); Michael E. Theroux, New Ipswich, NH (US); Giovanni Boschi, Pepperell, MA (US); Colin W. MacNaughton, San Francisco, CA (US); Ronald F. Rudis, North Andover, MA (US)

(73) Assignee: Progress Software Corporation, Bedford, MA (US)

( * ) Notice: Subject to any disclaimer, the term of this patent is extended or adjusted under 35 U.S.C. 154(b) by 1150 days.

(21) Appl. No.: 11/088,024

(22) Filed: Mar. 22, 2005

(51) Int. Cl.
*G06F 9/54* (2006.01)
(52) U.S. Cl. ............ 719/315; 714/1; 714/4.11; 714/6.3; 707/610; 707/649
(58) Field of Classification Search .................... 719/315
See application file for complete search history.

(56) References Cited

U.S. PATENT DOCUMENTS

| | | | |
|---|---|---|---|
| 5,245,616 A | 9/1993 | Olson | |
| 5,392,398 A | 2/1995 | Meyer | |
| 5,596,720 A | 1/1997 | Hamada et al. | |
| 5,758,354 A | 5/1998 | Huang et al. | |
| 5,765,033 A | 6/1998 | Miloslavsky | |
| 5,805,825 A | 9/1998 | Danneels et al. | |
| 5,822,526 A | 10/1998 | Waskiewicz | |
| 5,850,525 A | 12/1998 | Kalkunte et al. | |
| 5,857,201 A | 1/1999 | Wright, Jr. et al. | |
| 5,870,605 A | 2/1999 | Bracho et al. | |
| 5,878,056 A | 3/1999 | Black et al. | |
| 5,951,648 A | 9/1999 | Kailash | |
| 6,016,515 A | 1/2000 | Shaw et al. | |
| 6,061,559 A | 5/2000 | Eriksson et al. | |
| 6,112,323 A | 8/2000 | Meizlik et al. | |

(Continued)

FOREIGN PATENT DOCUMENTS

EP 1420562 A2 5/2004

(Continued)

OTHER PUBLICATIONS

"A powerful new tool to help validated error-handling code," Nov. 2004, pp. 1-4, Compuware Corporation.

(Continued)

*Primary Examiner* — S. Sough
*Assistant Examiner* — Syed Roni
(74) *Attorney, Agent, or Firm* — Wilmer Cutler Pickering Hale & Dorr LLP.

(57) ABSTRACT

A fault-tolerant messaging system comprises a primary broker, a first network, a back up broker, and a second network. The primary broker and the back up broker are coupled to the first network for communication with clients thus creating a messaging system. The primary broker and the back up broker are also coupled to the second network for replicating state from the primary broker and the back up broker, and also sending transaction events immediately to maintain synchronization. The brokers further comprise a replication module for communicating state between the primary broker and the back up broker, a recovery module for performing recovery on the back up broker upon failure of the primary broker, and a fault-tolerant connection module for establishing a fault-tolerant connection between the primary broker and the back up broker over the second network. The present invention also includes a number of novel methods for performing fault tolerance.

36 Claims, 15 Drawing Sheets

U.S. PATENT DOCUMENTS

| | | | |
|---|---|---|---|
| 6,128,646 A | 10/2000 | Miloslavsky | |
| 6,145,781 A | 11/2000 | Kawabe et al. | |
| 6,167,445 A | 12/2000 | Gai et al. | |
| 6,185,695 B1* | 2/2001 | Murphy et al. | 714/4 |
| 6,289,212 B1 | 9/2001 | Stein et al. | |
| 6,298,455 B1 | 10/2001 | Knapman et al. | |
| 6,304,882 B1* | 10/2001 | Strellis et al. | 707/202 |
| 6,336,119 B1 | 1/2002 | Banavar et al. | |
| 6,397,352 B1 | 5/2002 | Chandrasekaran et al. | |
| 6,452,934 B1 | 9/2002 | Nakata | |
| 6,453,346 B1 | 9/2002 | Garg et al. | |
| 6,484,198 B1 | 11/2002 | Milovanovic et al. | |
| 6,513,154 B1 | 1/2003 | Porterfield | |
| 6,643,682 B1 | 11/2003 | Todd et al. | |
| 6,647,544 B1 | 11/2003 | Ryman et al. | |
| 6,728,715 B1 | 4/2004 | Astley et al. | |
| 6,732,175 B1 | 5/2004 | Abjanic | |
| 6,782,386 B1 | 8/2004 | Gebauer | |
| 6,785,678 B2* | 8/2004 | Price | 707/8 |
| 6,792,460 B2 | 9/2004 | Oulu et al. | |
| 6,801,604 B2 | 10/2004 | Maes et al. | |
| 6,807,636 B2 | 10/2004 | Hartman et al. | |
| 6,816,898 B1 | 11/2004 | Scarpelli et al. | |
| 6,874,138 B1* | 3/2005 | Ziegler et al. | 717/127 |
| 6,877,107 B2* | 4/2005 | Giotta et al. | 714/4 |
| 6,898,556 B2 | 5/2005 | Smocha et al. | |
| 6,901,447 B2 | 5/2005 | Koo et al. | |
| 6,944,662 B2 | 9/2005 | Devine et al. | |
| 6,983,479 B1 | 1/2006 | Salas et al. | |
| 7,007,278 B2 | 2/2006 | Gungabeesoon | |
| 7,028,089 B2 | 4/2006 | Agarwalla et al. | |
| 7,039,701 B2 | 5/2006 | Wesley | |
| 7,096,263 B2 | 8/2006 | Leighton et al. | |
| 7,103,054 B2 | 9/2006 | Novaes | |
| 7,177,929 B2 | 2/2007 | Burbeck et al. | |
| 7,251,689 B2 | 7/2007 | Wesley | |
| 7,287,097 B1 | 10/2007 | Friend et al. | |
| 7,296,073 B1* | 11/2007 | Rowe | 709/227 |
| 7,302,634 B2 | 11/2007 | Lucovsky et al. | |
| 7,334,022 B2 | 2/2008 | Nishimura et al. | |
| 7,359,919 B2 | 4/2008 | Cohen et al. | |
| 7,379,971 B2 | 5/2008 | Miller et al. | |
| 7,386,630 B2 | 6/2008 | Liong et al. | |
| 7,395,349 B1 | 7/2008 | Szabo et al. | |
| 7,406,440 B2 | 7/2008 | Napier et al. | |
| 7,406,537 B2 | 7/2008 | Cullen | |
| 7,418,501 B2 | 8/2008 | Davis et al. | |
| 7,433,835 B2 | 10/2008 | Frederick et al. | |
| 7,464,154 B2 | 12/2008 | Dick et al. | |
| 7,467,196 B2 | 12/2008 | Di Luoffo et al. | |
| 7,487,510 B1 | 2/2009 | Carr | |
| 7,496,637 B2 | 2/2009 | Han et al. | |
| 7,512,957 B2 | 3/2009 | Cohen et al. | |
| 7,516,191 B2 | 4/2009 | Brouk et al. | |
| 7,533,172 B2 | 5/2009 | Traversat et al. | |
| 7,539,656 B2 | 5/2009 | Fratkina et al. | |
| 7,543,280 B2 | 6/2009 | Rosenthal et al. | |
| 7,603,358 B1 | 10/2009 | Anderson et al. | |
| 7,702,636 B1 | 4/2010 | Sholtis et al. | |
| 7,752,604 B2 | 7/2010 | Genkin et al. | |
| 7,801,946 B2 | 9/2010 | Bearman | |
| 7,801,976 B2 | 9/2010 | Hodges et al. | |
| 7,881,992 B1 | 2/2011 | Seaman et al. | |
| 7,887,511 B2 | 2/2011 | Mernoe et al. | |
| 7,895,262 B2 | 2/2011 | Nielsen et al. | |
| 7,941,542 B2 | 5/2011 | Broda et al. | |
| 8,001,232 B1 | 8/2011 | Saulpaugh et al. | |
| 8,060,553 B2 | 11/2011 | Mamou et al. | |
| 2001/0007993 A1 | 7/2001 | Wu | |
| 2002/0010781 A1 | 1/2002 | Tuatini | |
| 2002/0026473 A1 | 2/2002 | Gourraud | |
| 2002/0107992 A1 | 8/2002 | Osbourne et al. | |
| 2002/0161826 A1 | 10/2002 | Arteaga et al. | |
| 2003/0005174 A1 | 1/2003 | Coffman et al. | |
| 2003/0009511 A1* | 1/2003 | Giotta et al. | 709/201 |
| 2003/0014733 A1 | 1/2003 | Ringseth et al. | |
| 2003/0041178 A1 | 2/2003 | Brouk et al. | |
| 2003/0055920 A1 | 3/2003 | Kakadia et al. | |
| 2003/0061404 A1 | 3/2003 | Atwal et al. | |
| 2003/0074579 A1 | 4/2003 | Della-Libera et al. | |
| 2003/0093500 A1 | 5/2003 | Khodabakchian et al. | |
| 2003/0101210 A1 | 5/2003 | Goodman et al. | |
| 2003/0120665 A1 | 6/2003 | Fox et al. | |
| 2003/0145341 A1 | 7/2003 | Thames et al. | |
| 2003/0167293 A1* | 9/2003 | Zhu et al. | 709/102 |
| 2003/0204644 A1 | 10/2003 | Vincent et al. | |
| 2004/0030947 A1 | 2/2004 | Aghili et al. | |
| 2004/0088140 A1 | 5/2004 | O'Konski et al. | |
| 2004/0133633 A1 | 7/2004 | Fearnley et al. | |
| 2004/0186817 A1 | 9/2004 | Thames et al. | |
| 2004/0193703 A1 | 9/2004 | Loewy et al. | |
| 2004/0216127 A1 | 10/2004 | Datta et al. | |
| 2004/0225724 A1 | 11/2004 | Pavlik et al. | |
| 2005/0027853 A1 | 2/2005 | Martin et al. | |
| 2005/0038708 A1 | 2/2005 | Wu | |
| 2005/0203915 A1* | 9/2005 | Zhu et al. | 707/10 |
| 2005/0262515 A1* | 11/2005 | Dinh et al. | 719/314 |
| 2006/0031481 A1 | 2/2006 | Patrick et al. | |
| 2006/0173985 A1 | 8/2006 | Moore | |
| 2006/0195819 A1 | 8/2006 | Chory et al. | |
| 2006/0206440 A1 | 9/2006 | Anderson et al. | |
| 2006/0224702 A1 | 10/2006 | Schmidt et al. | |
| 2006/0224750 A1 | 10/2006 | Davies et al. | |
| 2006/0230432 A1 | 10/2006 | Lee et al. | |
| 2007/0174393 A1 | 7/2007 | Bosschaert et al. | |
| 2008/0059220 A1 | 3/2008 | Roth et al. | |
| 2008/0148346 A1 | 6/2008 | Gill et al. | |
| 2008/0172270 A1 | 7/2008 | Eckenroth | |
| 2009/0319832 A1 | 12/2009 | Zhang et al. | |
| 2009/0326997 A1 | 12/2009 | Becker et al. | |
| 2010/0017853 A1 | 1/2010 | Readshaw | |
| 2010/0030718 A1 | 2/2010 | Anderson et al. | |
| 2010/0304992 A1 | 12/2010 | An et al. | |

FOREIGN PATENT DOCUMENTS

WO WO-9922288 5/1999

OTHER PUBLICATIONS

"Agitator," online retrieved on Feb. 15, 2005) Retrieved from the internet ,URL:http://www.agitar.com/products/000024.html., pp. 1-5, Agitar Software, Inc.

"AmberPoint Express", (online, retrieved on Dec. 23, 2004), Retrieved from the internet ,URL:http://www.amberpoint.com/solutions/express_print.html., pp. 1-2, AmberPoint Solutions.

"Extensible Markup Language (XML) 1.0 (Second Edition)", Oct. 6, 2000 (online, retrieved on Aug. 3, 2006), Retrieved from the internet <URL:htt;://www.w3.org/TR/2000/REC-xml-20001006>, pp. 1-43, W3C.

"Interoperability: The Key to Quality Web Services," Mar. 2004 (online) retrieved on Nov. 17, 2004; Retrieved from the internet: <URL:http://www.mindreef.com/products.whitepapers/whitepaper-2html>, pp. 1-9, Mindreef, Inc., (no longer available on the internet).

"ProactiveNet 6.0 Optimize Application Performance to Meet Business Objectives" 2004, pp. 1-4, ProactiveNet, Inc., CA.

Abbreviated Examination Report, GB0517847.0, Dec. 1, 2005 (1 page).

Barton, J.J. et al., "SOAP Messages with Attachments," World Wide Web Consortium, W3C Note, Dec. 11, 2000, retrieved online on Jul. 24, 2003, from <URL:http://www.w3.org/TR/SOAP-attachments> (8 pages).

Bilorusets et al.; Web Services Reliable Messaging Protocol (WS-ReliableMessaging); Feb. 2005; http://msdn.microsoft.com/library/en-us/dnglobspec/html/WS-ReliableMessaging.pdf (40 pages).

Biron P.V. et al., "XML Schema Part 2: Datatypes," World Wide Web Consortium, W3C Recommendation, May 2, 2001, retrieved online Jul. 11, 2003, retrieved from <URL:http://www.w3.org/TR/xmischema-2> (116 pages).

Box, D. et al., "Simple Object Access Protocol (SOAP) 1. 1," World Wide Web Consortium, W3C Note, May 8, 2000, retrieved online on Jul. 23, 2003, retrieved from <URL:http://www.w3.org.TR/2000/NOTE-SOAP-20000508/> (28 pages).

Bray, T. et al., Extensible Markup Language (XML) 1.0 (Second Edition), World Wide Web Consortium, W3c Recommendation, Oct. 6, 2001, retrieved online on Jul. 11, 2003, retrieved from RL:http://www.w3.org/TR/REC-xml> (44 pages).

Christensen, E. et al., "Web Services Description Language (WSDL) 1.1," World Wide Web Consortium, W3C Note, Mar. 15, 2001, retrieved online on Jul. 11, 2003, retrieved from <URL:http://www.w3.org.TR/wsdl> (40 pages).

Clark, J. et al., "XML Path Language (Xpath)," World Wide Web Consortium, W3C Recommendation, Nov. 16, 1999, retrieved online on Jul. 11, 2003, retrieved from <URL:http://www.w3.org/TR/xpath> (119 pages).

Clark, J., "XSL Transformations (XSLT) Version 1.0," World Wide Consortium W3C Recommendation, Nov. 16, 1999, retrieved online on Jul. 11, 2003, retrieved from <URL:http://www.w3.org/TRxsit> (28 pages).

Copyright © OASIS, 2001, "Oasis/ebXML Registry Information Model v1.0 Draft, OASIS/ebXML Registry Technical Committee," retrieved online on Jun. 27, 2001, retrieved from <URL:http://www.oasis-open.org/committees/regrap/documents/rimv1.0.doc> (43 pages).

Copyright © UN/CEFACT and OASIS, 2001, "Message Service Specification, ebXML Transport, Routing & Packaging, Version 1.0," retrieved online on May 11, 2001, retrieved from <URL:http://www.ebxml.org/specs/ebMS.pdf> (75 pages).

Corba Messaging 22: Common Object Request Broker Architecture (CORBA), v3.0.3; Mar. 2004; http://www.omg.org/docs/formal/04-03-12.pdf (p. 85, total: 100 pages).

Fallside, D.C., "XML Schema Part 0: Primer," World Wide Web Consortium, W3C Recommendation, May 2, 2001, retrieved on Jul. 11, 2003, retrieved from <URL:http://www.w3.org/TR/xmischema-0> (57 pages).

Final Office Action dated Oct. 18, 2005 from U.S. Appl. No. 10/015,502 (29 pages).

Martin, B. "Build distributed applications with Java and XML," Feb. 2000, (online, retrieved on Jun. 10, 2005), Retrieved from the internet ,URL: http://www.javaworld.com/javaworld/jw-02-2000/JW-02-ssj-xml__phtml>, pp. 103 Java World.

Merrick, P. et al., "Web Interface Definition Language (WIDL)," World Wide Web Consortium, Submitted to W3C Sep. 22, 1997, © 1997, webMethods, Inc., retrieved online on Aug. 11, 2003, retrieved from <URL:http://www.w3.org/TR/NOTE-widl> (16 pages).

Mitchko, J. "Mindreef SOAPscope 1.0", (online, retrieved on Sep. 27, 2004), retrieved from the internet <URL:http://www.sys-con.com/webservices/articleprint.cfm?id+597., pp. 1-3, SYS-CON Media, Inc.

Notification Service Specification; Object Management Group; Version 1.1 formal/04-10-13; Oct. 2004; http://www.omg.org/docs/formal/04-10-13.pdf (118 pages).

Office Action dated Aug. 5, 2005 from U.S. Appl. No. 10/015,501 (8 pages).

Office Action dated Mar. 28, 2005, issued in U.S. Appl. No. 10/015,502 (26 pages).

Schaffner, Brian, "Debug SOAP apps with Apache TCP Tunnel/Monitor", Jan. 30, 2003 (online, retrieved on Dec. 23, 2004), Retrieved from the internet ,URL:hhtp://www.builder.com.com/5102-6389-1049605.html., pp. 1-2, CNET Networks, Inc.

Thompson, H.S. et al., "XML Schema Part 1: Structures," World Wide Web Consortium, W3C Recommendation, May 2, 2001, retrieved on Jul. 11, 2003, retrieved from <URL:http://www.w3.org/TR/xmischema-1> (151 pages).

Transmission Control Protocol; Darpa Internet Program Protocol Specification; Sep. 1981; http://www.ietf.org/rfc/rfc0793.txt?number=793 (84 pages).

Web Services Reliable Messaging TC WS-Reliability 1.1; OASIS Open 2003-2004; Oasis Standard, Nov. 15, 2004; http://docs.oasis-open.org/wsrm/ws-reliability/v1.1/wsrm-ws__reliability-1.1-spec-os.pdf (74 pages).

* cited by examiner

FAULT-TOLERANT MESSAGING SYSTEM AND METHODS

CROSS-REFERENCE TO RELATED APPLICATION

This application relates to U.S. patent application Ser. No. 10/773,803, now U.S. Pat. No. 7,406,537, entitled "Dynamic Subscription and Message Routing on a Topic Between Publishing Nodes and Subscribing Nodes," filed Feb. 6, 2004, which is incorporated herein by reference. This application also relates to U.S. Utility patent application Ser. No. 10/304,992, now U.S. Pat. No. 7,039,671, entitled "Dynamically Routing Messages between Software Application Programs Using Named Routing Nodes and Named Message Queues" filed on Nov. 26, 2002, which is incorporated herein by reference in its entirety.

BACKGROUND OF THE INVENTION

1. Field of the Invention

The present invention relates to systems and methods for sending and receiving messages. In particular, the present invention relates to a system and method for sending and receiving messages using fault-tolerant or high availability architecture.

2. Description of the Background Art

The use and proliferation of distributed computing networks is ever increasing. With the advent and business use of the Internet, the need for more efficient distributed computing system has become critical. The business use of the Internet has forced the integration of disparate computing environments with distributed computing systems that enable data transfer between such disparate systems. This in turn has created a need for better messaging systems that can handle amount of data and communication that are needed to effectively let disparate systems operate together and share information.

Such distributed processing and messaging systems are now used for a variety of applications. As they have been used for more applications, there is increasing demand for systems that are fault-tolerant such that the messaging systems can be used for financial transactions, equity trades and other messaging that demands high availability. However, there are very few such systems that can provide such fault tolerance, and those that have fault tolerance do so with a penalty in cost, performance, and/or hardware requirements.

A typical prior art approach for providing fault tolerance is shown in FIG. 1 with a system 100 including a first server A 100, a second server A' 102 and a shared storage 104. The state of the first server A 100 is persisted or stored on the shared storage 104 such that in the event server A become unavailable, server A' can recover using the state information on storage 104.

However, the prior art systems 100 suffer from a number of shortcomings. First, there is no live or hot recovery. Any failover requires that server A' perform recovery from disk which requires time during which pending transactions will be lost. Second, additional software is required to manage the two servers 102, 104 during start up and back up. This software is not used anywhere else for operation of the messaging systems or servers. Third, hardware locks are used to detect the failure of a server. Such hardware locks are difficult to distribute to the tens or hundreds of servers that may be part of a messaging system. Fourth, typically, the Server A' cannot be used for any other function that the back up to server A, and therefore the prior art effectively doubles the hardware costs to provide fault tolerance.

Therefore, what is needed is a system and methods for implementing a fault-tolerant messaging system that overcomes the limitations found in the prior art.

SUMMARY OF THE INVENTION

The present invention overcomes the deficiencies and limitations of the prior art by providing a fault-tolerant messaging system. In one embodiment, the fault-tolerant messaging system comprises a primary broker, a first network, a back up broker, and a second network. The primary broker and the back up broker are coupled to the first network for communication with clients thus creating a messaging system. The primary broker and the back up broker are also coupled to the second network for replicating state from the primary broker and the back up broker, and also sending transaction events immediately to maintain synchronization between the primary broker and the back up broker. The brokers preferably further comprise a replication module for communicating state between the primary broker and the back up broker, a recovery module for performing recovery on the back up broker upon failure of the primary broker, and a fault-tolerant connection module for establishing a fault-tolerant connection between the primary broker and the back up broker over the second network. In an alternate embodiment, the recovery module of the primary broker may maintain a log of transactions and send them to the back broker over the second network in batches of transactions.

The present invention also includes a number of novel methods including: a method for performing fault tolerance; a method for replication of broker state from a primary broker and a back up broker; a method for maintaining or synchronizing the state of a primary broker and a back up broker; a method for performing recovery to a back up broker after a failure; a method for operation of a fault-tolerant connection between a client and a broker; and a method for dynamic synchronization between a primary broker and a back up broker according to the present invention.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION OF THE PREFERRED EMBODIMENTS

Figure 1:
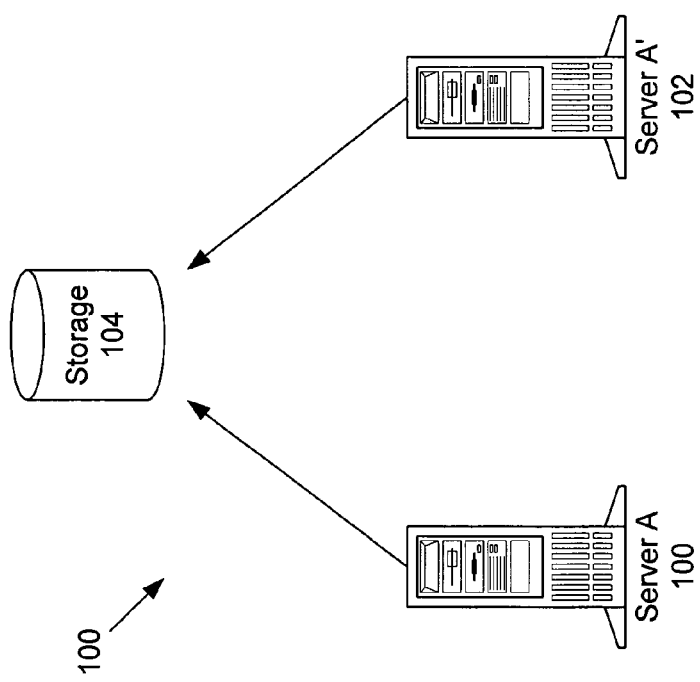
FIG. 1 is a block diagram of a prior art fault-tolerant messaging system.

A system and method for fault-tolerant messaging is described. More specifically, the present invention is a software solution that does not require additional hardware or hardware changes and can operate on a variety of platforms to provide a fault-tolerant messaging system. In one embodiment, the fault-tolerant messaging system provides real-time message event back up so that recovery in the middle of transaction can be accomplished. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to failover from a primary broker to an associated back up broker. However, the present invention applies to any distributed computing system that has fault tolerance and the servers or nodes running brokers, and may include significantly more brokers, servers and clusters.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be an entire messaging system or only portions of such a system. For example, the present invention can operate with an information system that need only be a broker in the simplest sense to process messages. Thus, the present invention is capable of operating with any information system from those with minimal functionality to those providing all the functionality disclosed herein.

DEFINITIONS

The present invention describes a fault-tolerant messaging system 200, and in doing so uses a number of terms some of which are defined below as follows:

Active Broker: Of the primary/back up broker pair, only one broker is actively processing messaging activity at any one moment, and that broker is said to be the active broker. The active and standby roles are dynamic and they change during failover.

Back up Broker: A back up broker is associated with a primary broker, and is a broker that becomes active upon failure of the primary broker or failure of the all the primary broker's replication connection(s) to the back up broker(s). The primary and back up brokers communicate over a replication connection to replicate state, and over a public or service network to provide a service to clients.

Failover: The process beginning with the failure of an active broker, through the transfer of the active role to another broker in the same fault tolerant set, and ending with the reconnection of any clients to the new active broker and the completion of any pending operations.

Fault tolerant broker: a broker configured for fault tolerance; whether or not an operation against a fault tolerant broker is actually protected from failure depends further on the state of the broker, and on the type of connection.

Fault tolerant set: a fault tolerant broker and any back up broker(s) deployed to protect it from failure. The brokers in a fault tolerant set share the same identity with respect to clients and other brokers in a cluster; only one broker in a fault tolerant set may be actively processing client and cluster requests at any one time. A fault tolerant set preferably consists of a primary broker and a single back up broker, but alternatively multiple back up brokers may be supported in the future.

K-resilient: a system or architecture tolerant of up to k concurrent failures. For example, in the context of the brokers of the present invention, a 1-resilient fault tolerance architecture provides uninterrupted service to clients in the event the failure of one broker, but not if the back up broker also fails before the original broker is returned to service.

Partition: a network failure that leaves two processes running but unable to communicate; to each process, a partition failure is indistinguishable from a failure of the other process. The Active-Standby fault-tolerance architecture of the present invention does not deal well with partition failures because they lead to multiple processes assuming the active role at the same time.

Primary Broker: A primary broker is messaging broker configured to replicate to a back up broker at any point, without reinitializing storage. The primary broker, if operating in a fault tolerant mode, has an associated back up broker coupled by a replication connection.

Replication Connection: A configured network path between primary broker and back up broker, specifying the network endpoints and attributes required to establish a replication connection. The replication connection is used to replicate state between the primary broker and the back up broker and monitor each other's status to detect failures.

Runtime Synchronization: Runtime synchronization is the process of synchronizing two brokers while one is actively servicing messaging operations. It is triggered automatically when one broker starts up, connects to the other and finds it active.

Standby Broker: Of the primary/back up broker pair, only one broker is actively processing messaging activity at any one moment, and that broker that is not actively processing messaging activity is said to be the standby broker. The active and standby roles are dynamic and they change during failover.

Storage Synchronization: Storage synchronization is the process of synchronizing (updating the state of one broker to match the state of the other broker) the state of the two brokers while they are both down: It is an administrative operation analogous to storage initialization, and requires that the broker on which it is invoked have access to the recovery logs of both brokers.

System Overview

Figure 2A:
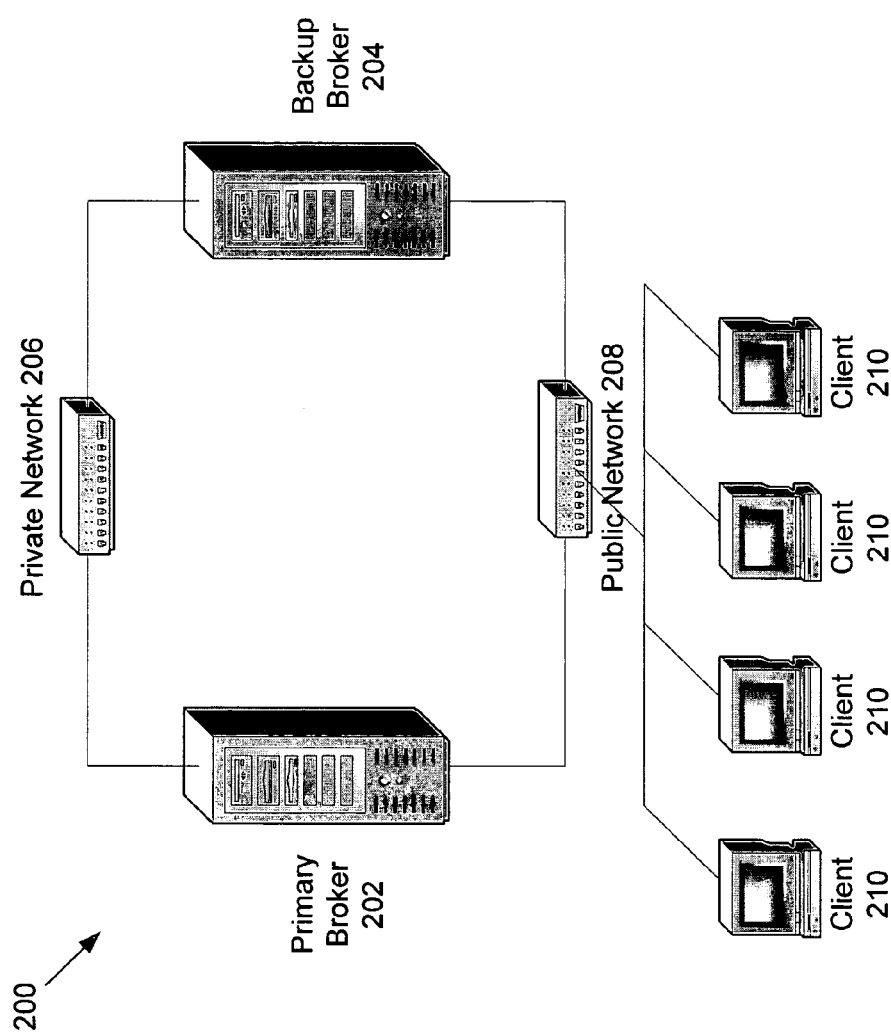
FIG. 2A is a block diagram of one embodiment of a fault-tolerant messaging system in accordance with the present invention.

Referring now to FIG. 2A, one embodiment of a fault-tolerant messaging system 200 is shown. The fault-tolerant messaging system 200 comprises a primary broker 202, a back up broker 204, a first network 206 and a second network 208. The primary broker 202 and the back up broker 204 are coupled to the second network 208 for communication with clients 210 thus creating a messaging system 200. The second network 208 is preferably a public network such as the Internet. The primary broker 202 includes the full functionality of a broker for sending and receiving messages in addition to the present invention as will be detailed below. The primary broker 202 and the back up broker 204 are also coupled to the first network 206 for replicating state from the primary broker 202 and the back up broker 204, and also for sending transactions and events immediately to maintain synchronization between the primary broker 202 and the back up broker 204. The first network 206 is preferably a private secure network. The second broker 204 also includes the full functionality of a broker for sending and receiving messages in addition to the present invention as will be detailed below. Such a configuration of the system 200 is particularly advantageous because the cost of providing fault tolerance is significantly reduced because the second broker 204 does not need to be dedicated to being available in the event of a failure and can be used for other messaging needs.

Figure 2B:
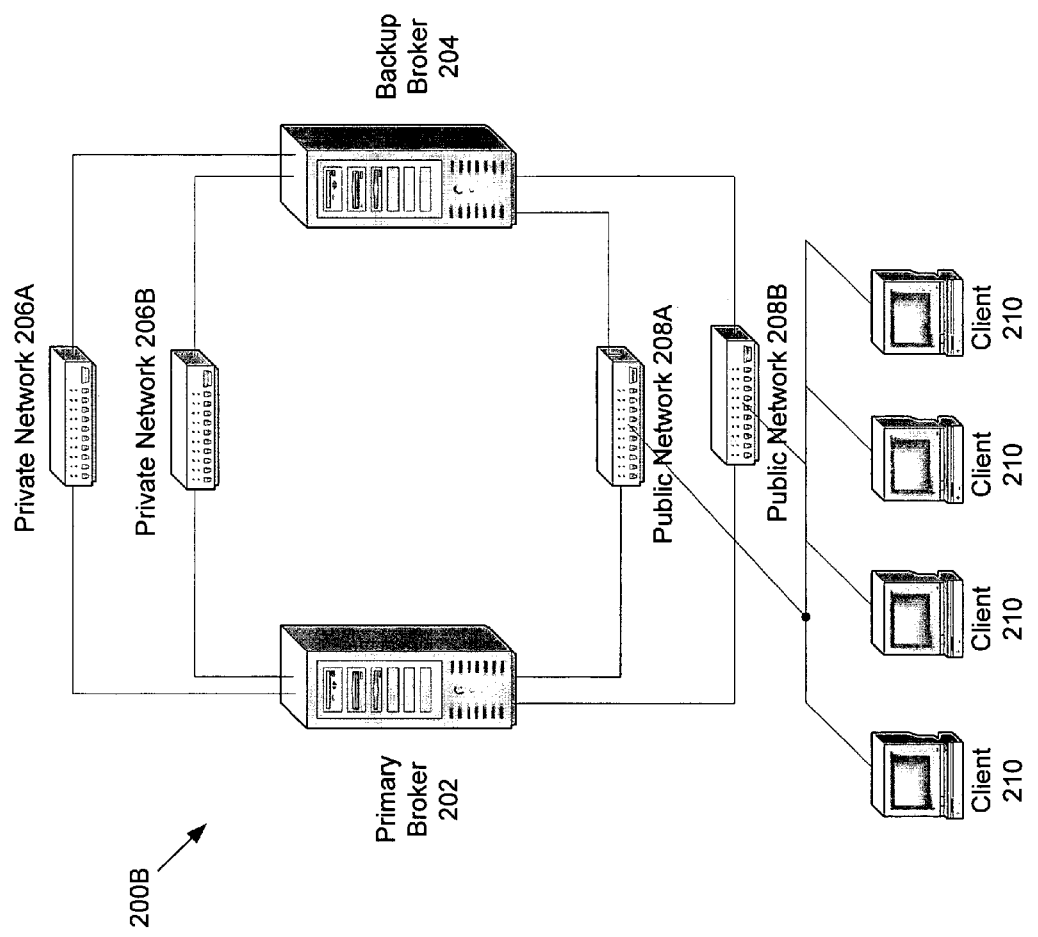
FIG. 2B is a block diagram of a second embodiment of the fault-tolerant messaging system in accordance with the present invention.

FIG. 2B shows a second embodiment of the fault-tolerant messaging system 200B. This second embodiment of the fault-tolerant messaging system 200B is similar to the first embodiment 200, except that it provides connections to multiple networks for connection redundancy to ensure communication paths between the primary broker 202 and the back up broker 204. For example, the second embodiment 200B has a plurality of private networks 206A and 206B coupled to the primary broker 202 and the back up broker 204 to maintain synchronization between them. Similarly, a plurality of connections to different parts of the public network 208A and 208B may be provided to ensure a connection for communication with clients, or protection from a single connection failure. While connection to only four networks are shown, those skilled in the art will recognize any number of connections to different networks may be provided depending on the level of fault tolerance desired.

While the present invention will now be described throughout this patent application in the context of a primary broker and one back up broker, those skilled in the art will recognize that there may be a variety of different configurations for providing fault tolerance, and that a primary broker 202 could have any number of back up brokers from 1 to n. Furthermore, while the following descriptions of the present invention describe fault tolerance and failover as happening from a primary to a back up broker (it is assumed below that the primary broker is in the active state and the back up broker is in the standby state), it is the runtime states of 'active' and 'standby' that determine the replication and failover roles, and that the primary and back up brokers can act in either of these roles. There could also be a variety of orderings in which the primary broker fails over to the n back up brokers. For example, this could be a static sequential order in which the primary broker fails over to another back up or it could change dynamically depending other uses of the back up brokers as will be understood to those skilled in the art.

Fault-Tolerant Clusters

Figure 3:
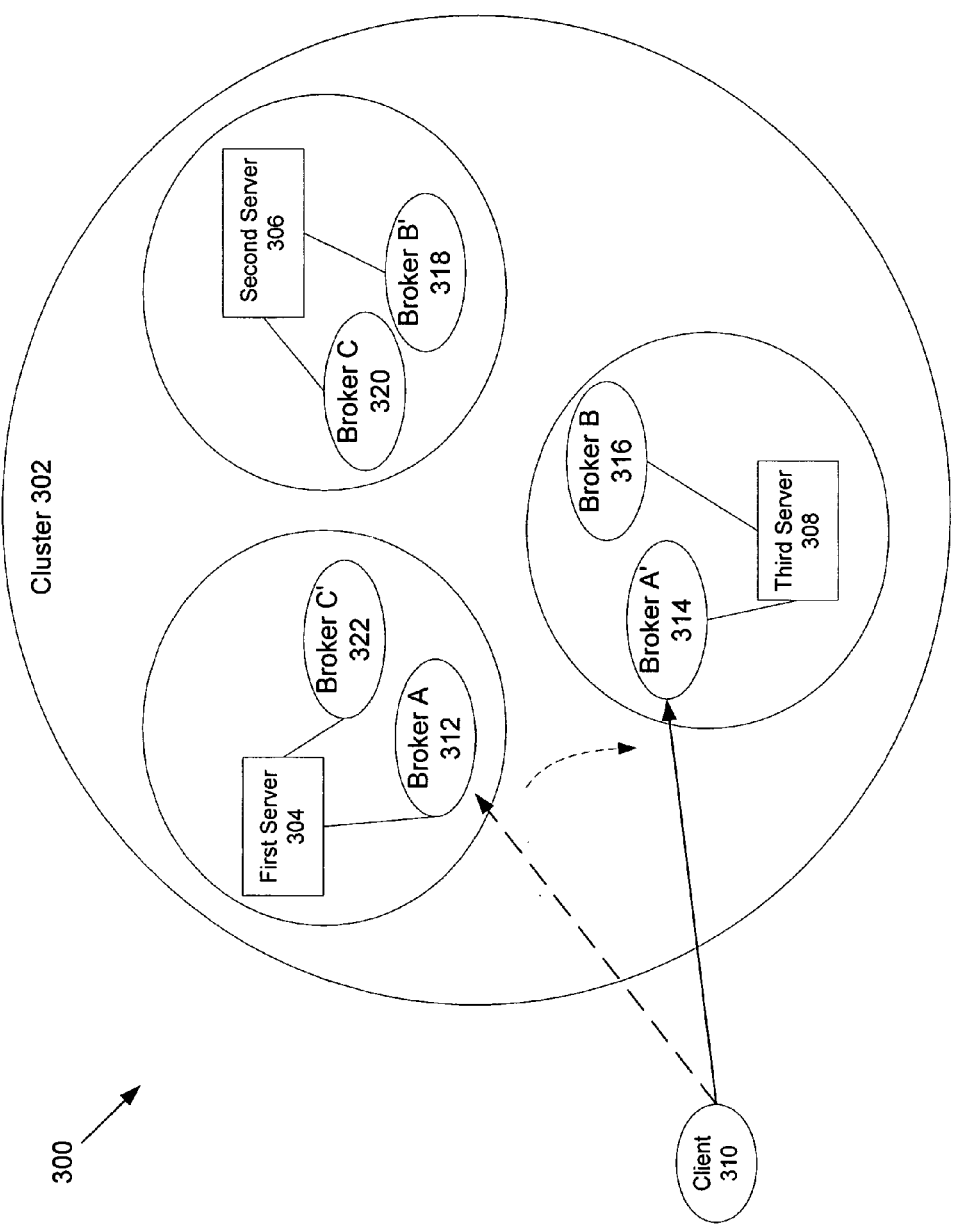
FIG. 3 is a block diagram of an exemplary cluster of servers including multiple primary/back up broker pairs on different servers.

FIG. 3 is a block diagram of a messaging system 300 including an exemplary cluster 300. The exemplary cluster 302 comprises a plurality of servers 304, 306, 308 including multiple primary/back up broker pairs 312-322 on different servers 304, 306, 308. The first server 304 is running a first broker A 312 and a second broker C' 322. The second broker C' 322 is a back up broker for a primary broker (broker C 320) running on the second server 306. Similarly, the second server 306 is running a third broker C 320 and a fourth broker B' 318.

The fourth broker B' 318 is a back up broker for a primary broker (broker B 316) running on the third server 308. Finally, the third server 308 is running a fifth broker A' 314 and a sixth broker B 316. The fifth broker A' 318 is a back up broker for a primary broker (broker A 312) running on the first server 308. In this embodiment each broker has a hot back up broker on another server 304, 306, 308. This is just illustrative of an exemplary configuration, and the cluster 302 may have a variety other configurations including brokers without any back up, more servers and brokers, and multiple back up brokers. In FIG. 3, an exemplary client 310 is shown. The client 310 is initially connected to server 304 and is in communication with broker A 312. Upon failure of server 304 or the connection to server 304, the client switches to communicate with the broker A' 314 running on server 308. The failure and switching transparent to the client 310 and even if done mid transaction, the operations can be completed using the back up broker A' 314.

While the systems 200, 300 described above include the functionality of distributed computing systems including messaging capability, these descriptions have been simplified for ease of understanding of the present invention. The systems 200, 300 also include full functionality of a dynamic routing architecture for messages and publish/subscribe messaging capabilities as detailed in co-pending U.S. patent application Ser. No. 10/773,803, now U.S. Pat. No. 7,406,537, entitled "Dynamic Subscription and Message Routing on a Topic Between Publishing Nodes and Subscribing Nodes," filed Feb. 6, 2004; and U.S. Utility patent application Ser. No. 10/304,992, now U.S. Pat. No. 7,039,671, entitled "Dynamically Routing Messages between Software Application Programs Using Named Routing Nodes and Named Message Queues" filed on Nov. 26, 2002, both of which are incorporated herein by reference in their entirety.

Server

Figure 4:
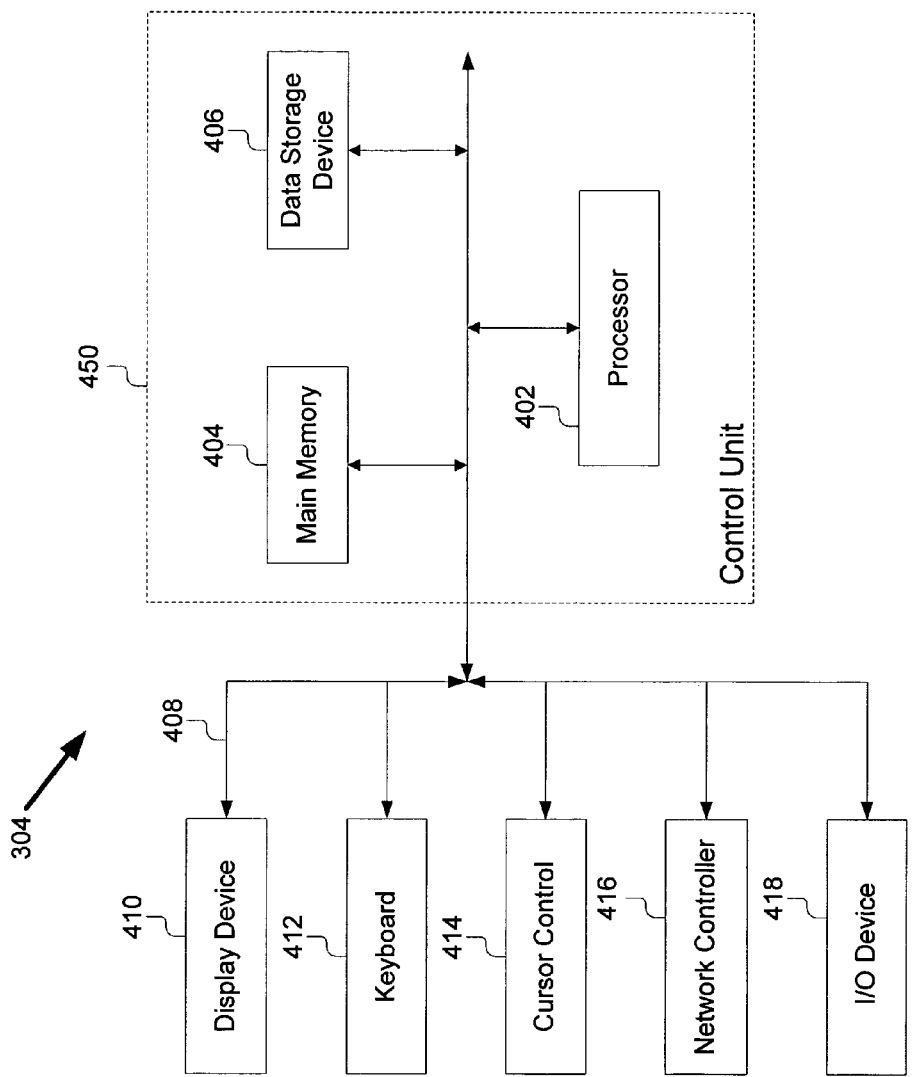
FIG. 4 is a block diagram of one embodiment of a server or node in accordance with a preferred embodiment of the present invention.

Referring now to FIG. 4, one embodiment of based functionality for a server 304 in accordance with a preferred embodiment of the present invention is shown. The server 304 preferably comprises a control unit 450, a display device 410, a keyboard 412, a cursor control device 414, a network controller 416 and one or more input/output (I/O) device(s) 418.

Control unit 450 may comprise an arithmetic logic unit, a microprocessor, a general purpose computer, a personal digital assistant or some other information appliance equipped to provide electronic display signals to display device 410. In one embodiment, control unit 450 comprises a general purpose computer having a graphical user interface, which may be generated by, for example, a program written in Java running on top of an operating system like WINDOWS® or UNIX® based operating systems. In one embodiment, one or more application programs are executed by control unit 450 including, without limitation, word processing applications, electronic mail applications, financial applications, and web browser applications.

Still referring to FIG. 4, the control unit 450 is shown including processor 402, main memory 404, and data storage device 406, all of which are communicatively coupled to system bus 408.

Processor 402 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included.

Main memory 404 stores instructions and/or data that may be executed by processor 402. The instructions and/or data may comprise code for performing any and/or all of the techniques described herein. Main memory 404 may be a dynamic random access memory (DRAM) device, a static random access memory (SRAM) device, or some other memory device known in the art. The memory 404 is described in more detail below with reference to FIGS. 5, 6 and 7. In particular, the portions of the memory 404 for providing fault tolerance by as a primary broker, a back up broker and a client will be described. Such functionality will include replication of state, recovery, fault tolerant connections, and other features of the present invention.

Data storage device 406 stores data and instructions for processor 402 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 408 represents a shared bus for communicating information and data throughout control unit 450. System bus 408 may represent one or more buses including an industry standard architecture (ISA) bus, a peripheral component interconnect (PCI) bus, a universal serial bus (USB), or some other bus known in the art to provide similar functionality. Additional components coupled to control unit 450 through system bus 408 include the display device 410, the keyboard 412, the cursor control device 414, the network controller 416 and the I/O device(s) 418.

Display device 410 represents any device equipped to display electronic images and data as described herein. Display device 410 may be, for example, a cathode ray tube (CRT), liquid crystal display (LCD), or any other similarly equipped display device, screen, or monitor. In one embodiment, display device 410 is equipped with a touch screen in which a touch-sensitive, transparent panel covers the screen of display device 410.

Keyboard 412 represents an alphanumeric input device coupled to control unit 450 to communicate information and command selections to processor 402.

Cursor control 414 represents a user input device equipped to communicate positional data as well as command selections to processor 402. Cursor control 414 may include a mouse, a trackball, a stylus, a pen, a touch screen, cursor direction keys, or other mechanisms to cause movement of a cursor.

Network controller 416 links control unit 450 to a network that may include multiple processing systems. The network of processing systems may comprise a local area network (LAN), a wide area network (WAN) (e.g., the Internet), and/or any other interconnected data path across which multiple devices may communicate. The control unit 450 also has other conventional connections to other systems such as a network for distribution of files (media objects) using standard network protocols such as TCP/IP, http, https, and SMTP as will be understood to those skilled in the art.

One or more I/O devices 418 are coupled to the system bus 408. For example, the I/O device 418 may be an audio input/output device 418 equipped to receive audio input via a microphone and transmit audio output via speakers. In one embodiment, audio device 418 is a general purpose; audio add-in/expansion card designed for use within a general purpose computer system. Optionally, I/O audio device 418 may contain one or more analog-to-digital or digital-to-analog converters, and/or one or more digital signal processors to facilitate audio processing.

It should be apparent to one skilled in the art that control unit 450 may include more or less components than those shown in FIG. 4 without departing from the spirit and scope of the present invention. For example, control unit 450 may include additional memory, such as, for example, a first or second level cache, or one or more application specific integrated circuits (ASICs). Similarly, additional components input/output devices 418 may be coupled to control unit 450 including, for example, image scanning devices, digital still or video cameras, or other devices that may or may not be equipped to capture and/or download electronic data to control unit 450.

Primary Broker

Figure 5:
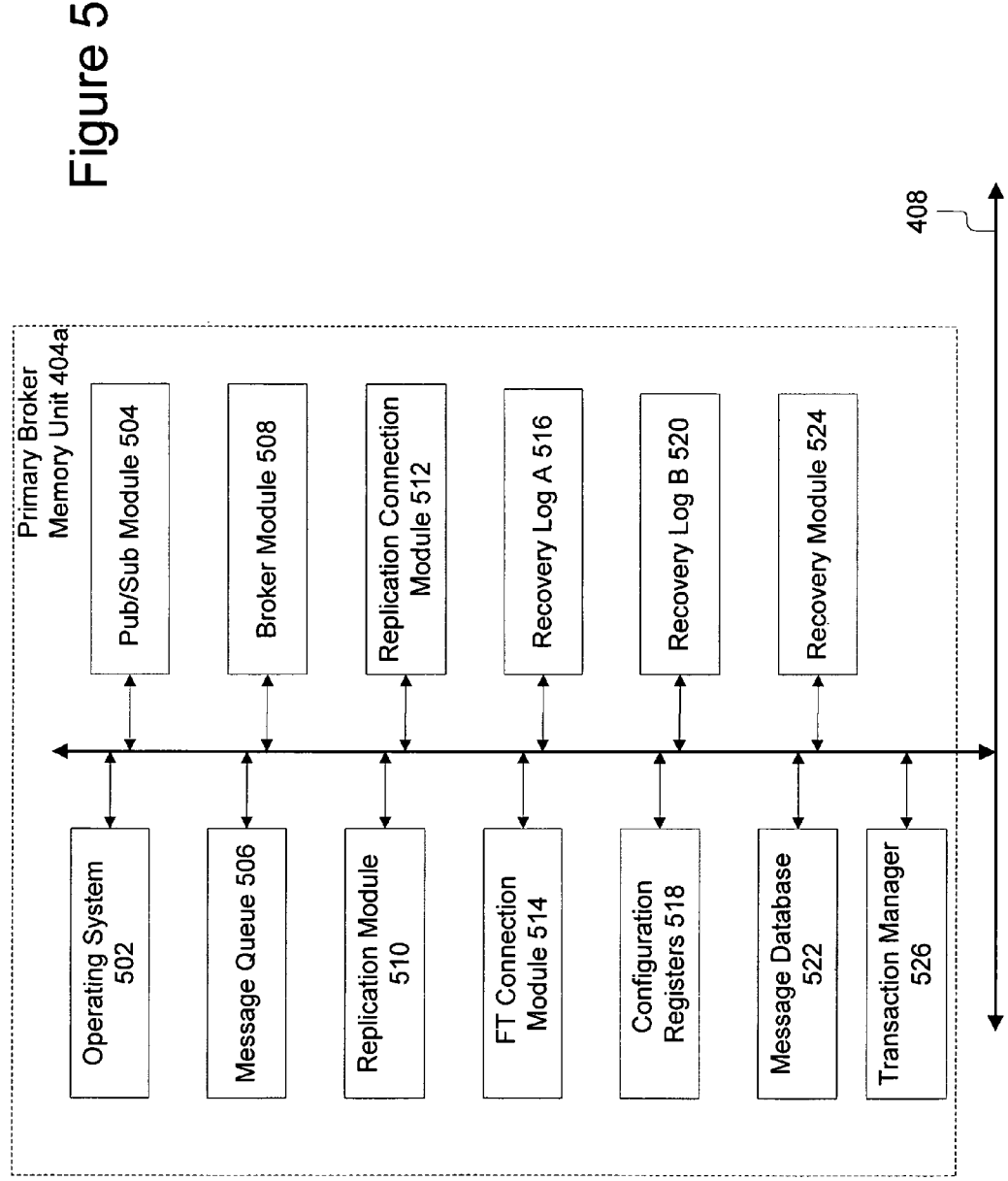
FIG. 5 is a block diagram of one embodiment of the memory for a server acting as a primary broker.

FIG. 5 is a block diagram of one embodiment of the memory 404a for a server 304 acting as a primary broker. The memory 404a for a primary broker preferably comprises an operating system 502, a publish/subscribe module 504, a message queue 506, a broker module 508, replication module 510, a replication connection module 512, a fault-tolerant (FT) connection module 514, a first recovery log A 516, one more configuration registers 518, a second recovery log B 520, a message database 522, a recovery module 524, and a transaction manager 526. As noted above, the memory unit 404a stores instructions and/or data that may be executed by processor 402. The instructions and/or data may comprise code for performing any and/or all of the techniques described herein. These modules 502-526 are coupled by bus 408 to the processor 402 for communication and cooperation to provide the fault tolerant messaging system 200. Those skilled in the art will recognized that while the present invention will now be described as modules or portions of a memory unit 404a of a computer system, the modules or portions may also be stored in other media such as permanent data storage device 406 and may be distributed across a network having a plurality of different computers such as in a client/server environment.

The operating system 502 is preferably one of a conventional type such as, WINDOWS®, SOLARIS® or LINUX® based operating systems. Although not shown, the memory unit 404a may also include one or more application programs including, without limitation, word processing applications, electronic mail applications, financial applications, and web browser applications.

The publish/subscribe module 504 is to establish a subscription to a topic for a node and to unsubscribe from a topic. It is also used to identify subscribers to a topic and transmit messages to subscribers dynamically. The publish/subscribe module 504 also includes other topic tables, queues and other elements necessary to implement publish/subscribe messaging on the system 200.

The message queue 506 stores messages that have been received from other server or nodes and that need to be forwarded to other nodes or distributed locally to subscribing applications. The message queue 506 is accessible to the broker 404a.

The broker module 508 is used to create instances of brokers 202, 204 with the functionality that has been described above. The broker module 422 manages the creation and deletion of broker instances to ensure the proper operation of the fault tolerant system 200. Each of the brokers has the full functionality of brokers as has been noted above and detailed in the related U.S. patent application Ser. Nos. 10/773,803, now U.S. Pat. No. 7,406,537, and 10/304,992, U.S. Pat. No. 7,039,671, both of which are incorporated herein by reference in their entirety.

The replication module 510 manages and maintains a copy of the state of the primary broker 202 on the back up broker 204. At the primary broker 202, the replication module 510 works with a corresponding replication module 510 on the back up broker 204. The replication module 510 replicates data and monitors the status of the back up broker 204 by communicating over a replication connection. In particular, the replication module 510 replicates storage state such that a message database 522 of the primary broker 202 is synchronized with a back up message database 604 stored on and used by the back up broker 204. The replication module 510 also maintains run-time synchronization by either: 1) immediately sending events being processed by the primary broker 202 to the back up broker 204 and using a guaranteed acknowledgement to ensure it is recorded on the recovery log 602 in the back up broker 204, or 2) by storing events in a recovery log 516/520 at the primary broker 202 and sending the events from the recovery log 516/520 to a corresponding recover log 602 at the back up broker 204 periodically or as needed when the recovery log 516 becomes full. Each transaction generates one or more events, and by storing the events, the transactions can be recovered. In one embodiment, the present invention may also include a fast log storage mechanism where a plurality of recovery logs 516, 520 are used and alternatively read to the back up broker 204, while on of the other of the plurality of recover logs 516, 520 is used to store transactions. The functions of the replication module 510 are described in more detail below with reference to FIGS. 10 and 11. The functions of the replication module 510 will be described below from the perspective of the back up broker with reference to FIG. 6 and more generally with reference to FIG. 10.

The replication connection module 512 manages and maintains a replication connection between the primary broker 202 and the back up broker 204. The primary broker 202 and the back up broker 204 replicate data, maintain synchronization and monitor each other's status by communicating over replication connections, which define pairs of network endpoints over which the brokers 202, 204 communicate to replicate data and to detect failures. The replication connection is preferably a secure connection and may include a plurality of channels. The replication connection module 512 manages and maintains a replication connection including definition and management of multiple replication connections in order to make use of multiple redundant network paths if available. Both brokers 202, 204 actively connect and maintain all defined replication connections, and regularly heartbeat replication connections in both directions to detect failures. Only one connection is used for replication at a time, but the brokers 202, 204 can switch to another connection without interrupting replication if one connection fails. Furthermore, the replication connection module 512 manages performs the following functions: initiating the connection of the first replication channel, selecting the active channel for replication based on the metrics, monitor the health of the replication channels via heartbeats, initiating the retry attempt to re-establish a failed channel, reporting any channel failure and generate the notification event, and implementing the acknowledgement exchange protocol to ensure no duplicate messages or missing acknowledgements.

The fault-tolerant (FT) connection module 514 is used to establish a fault-tolerant connection with the client 210 and the primary broker 202. The operation of fault-tolerant (FT) connection module 514 is described below with reference to FIG. 13. The fault tolerant connection is a connection in which the client will attempt to re-establish connection before failing over the back up broker 204. This module in the broker only attempts to re-establish a connection to the client and maintains the context of the client connection for a configurable amount of time to facilitate successful client reconnect and/or failover. The fault-tolerant (FT) connection module 514 is also used to send acknowledgement signals such that a "once and only once" messaging architecture can be used for communication between the client 210 and the primary broker 202. The fault-tolerant (FT) connection module 514 is used to generate the signals necessary to complete the handshaking process with the client as shown in FIG. 14. A graphical depiction of this messaging architecture is show in FIG. 14. The processing of persistent messages produced by clients 210 within a fault-tolerant connection advantageously includes a confirm acknowledgement message. Similar to persistent messaging of the prior art, a broker 202 responds to a persistent message with a guaranteed acknowledgement signal. There are no logging requirements on the client 210 at runtime. However, on the broker side, logging of message and ACK-ACK receipt is required to ensure state is replicated to a standby broker and to ensure that message state is recovered after a broker crash and restart. Confirmation is accomplished by a guaranteed message acknowledgement-acknowledgement sent from the client 210 to the broker 202.

The first recovery log A 516 provides an area to store transactions as the primary broker 202 processes them. In another embodiment, a second recovery log B 520 is provided for the same function. The first recovery log A 516 stores transactions so that they can be replicated to the back up broker 204. The transactions are preferably appended to the end of the log file so that they provide a sequential listing of transactions that can be used for recovery. The recovery module 524 is responsible for storing the transaction in the recovery log A 516 as they are received and processed by the primary broker 202. The recovery module 524 provides them to the replication module 510 for transmission and processing at the back up broker 524. In a second embodiment, the first recovery log A 516 and the second recovery log B 520 are used for fast log recovery. The second embodiment is a circular cataloguing system of events and synchronization points using the first recovery log A 516 and the second recovery log B 520. The recovery module 524 preferably writes events to one recovery log file at a time. When that recovery log file reaches a configured maximum size, the recovery module 524 will begin writing to the second recovery log file. A synchronization point also occurs when switching to a between the first recovery log A 516 and the second recovery log B 520 or vice versa. The recovery module 524 can write both transaction events and synchronization points to the recovery logs 516, 520. This process continues for the lifetime of the broker 202.

A "synchronization point" logs all information that is currently necessary to continue reliable broker messaging. Any information that is no longer necessary is discarded. This allows recovery log files to retain a reasonable size. The synchronization point may consist of many syncpoint events. These events begin with a "SyncBegin" event and end with a "SyncEnd" event. After the "SyncEnd" event is complete, database updates occur, including recording the position in the log file where the last SyncBegin was logged. After the database updates are complete, the next broker recovery will begin at the "SyncBegin" event that is logged. Interleaved among the sync events are new log events. These new events are from new messages or state changes that occur within the broker 202. The recovery module 524 does not attempt to halt new activity while the syncpoint is occurring. A synchronization point is very important to the log file system. Without a complete synchronization point, system 200 cannot guarantee reliable messaging due to broker failure.

The primary broker 202 includes one more configuration registers 518. These configuration registers are used to identify the operating mode of the primary broker 202, the identification and address of a back up broker 204, the channels to use when communicating and monitoring the back up broker 204 and other parameter necessary for establishing a fault-tolerant connection with a client and maintenance of state with a back up broker 204.

The message database 522 is a database of messages and state information for operation of the broker 202. The message database 522 preferably includes messages received, sent, and other state signals. The message database 522 is preferably stored on non-volatile storage such as a hard disk. The message database 522 is coupled to operate with the broker module 508 in a conventional manner for a messaging system. The messaging database 522 is also accessible by the replication module 510 and the recovery module 524 for performance of their functions as has been described above.

A recovery module 524 is also included in the primary broker memory 404a for storing transactions or events in process by the primary broker 202. The recovery module is responsible for storing data necessary for recovery in the recovery log and between synchronization points to the message database 522. As noted above, the recovery module works in cooperation with the replication module 510. The recovery module 524 also includes other processing for recovering the primary broker after failure or upon start up to bring the primary broker 202 up in a predefined state. The operation of the recovery module 524 will be described in more detail below with reference to FIG. 12.

Finally, the memory unit 404a includes a transaction manager 526. The transaction manager 526 is used to track the state of transactions. The transaction manager 526 keep track of transaction state, and keeps transactions open until complete. If a transaction is open during failover, the transaction manager 526 has sent state information for the transaction to the back up broker 204 such that the back up broker is able to continue and complete after failover. The transaction manager 526 receives messages and events and maintains transaction state since the transaction manager 526 of the primary broker 404a (active broker in this case) is coupled for communication with a corresponding transaction manager 526 of the back up broker 202 (standby in this case). The transaction manager 526 is also coupled to bus 408 for communication with other components of the primary broker memory unit 404a.

Those skilled in the art will recognize that, although the various processes and their functionality have been described with respect to particular embodiments, these processes and/ or their functionality can be combined into a single process or into any combination of multiple processes. The processes can also be provided using a combination of built-in functions of one or more commercially available software application programs and/or in combination with one or more custom-designed software modules.

Back up Broker

Figure 6:
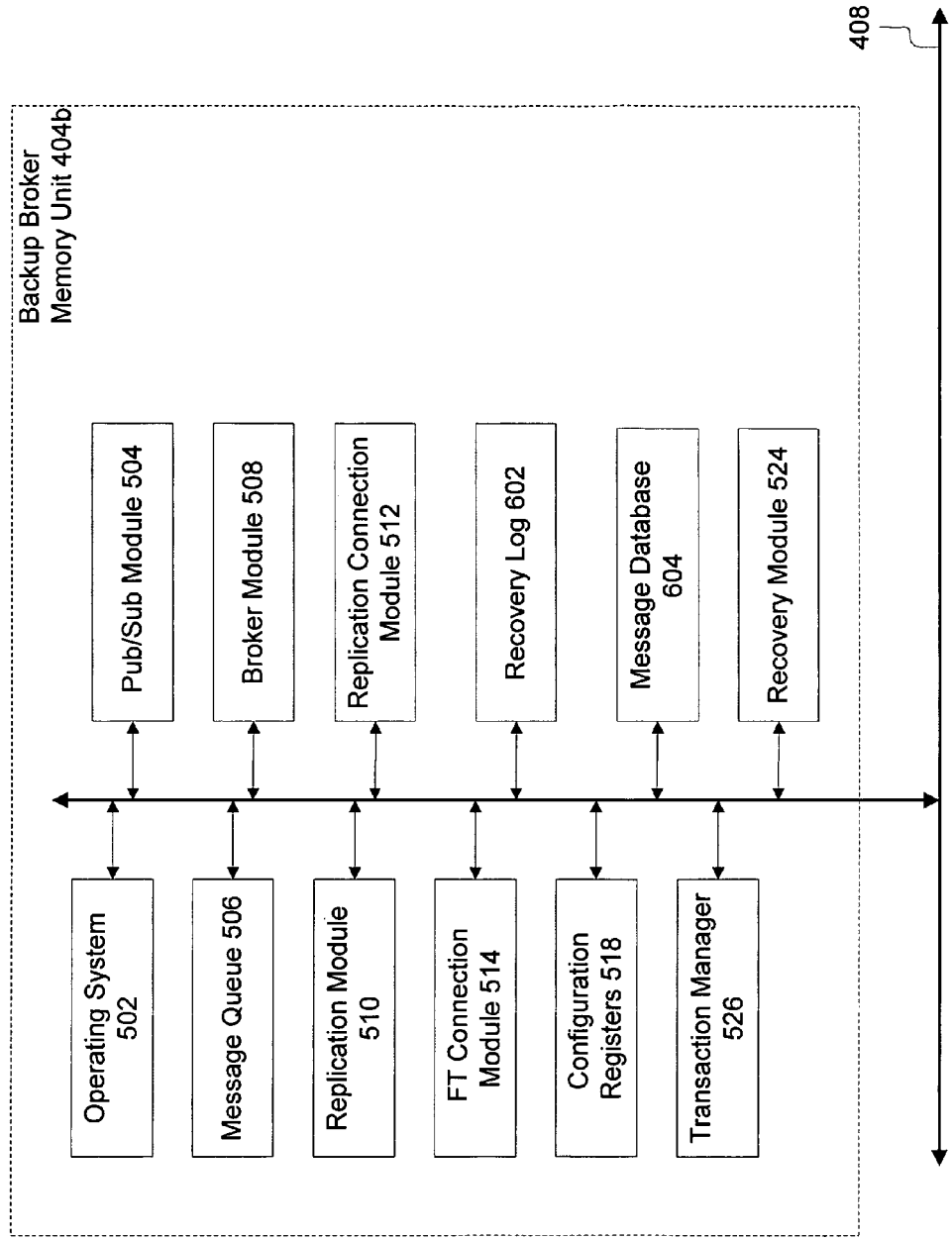
FIG. 6 is a block diagram of one embodiment of the memory for a server acting as a back up broker

FIG. 6 is a block diagram of one embodiment of the memory 404b for a server 304 acting as a back up broker 204. The memory 404b of back up broker 204 has similar functionality to the primary broker 202, but differs in a number of respects. Where appropriate for ease of understanding and clarity, like reference numerals and names have been used for like components having similar functionality to that of the primary broker 202 in the description below of the memory 404b of the back up broker 204.

The memory 404b for the back up broker 204 preferably comprises an operating system 502, a publish/subscribe module 504, a message queue 506, a broker module 508, a replication module 510, a replication connection module 512, a fault-tolerant (FT) connection module 514, a recovery log 602, one more configuration registers 518, a message database 604, and a recovery module 524.

The operating system 502, publish/subscribe module 504, message queue 506, and broker module 508 have the same functionality as has been described above, but for the back up broker 204.

The replication module 510 of the back up broker 204 synchronizes the state of the back up broker 204 to that of the primary broker 202. In particular, the replication module 510 of the back up broker 204 communicates with the replication module 510 of the primary broker 202 for both storage synchronization and run-time synchronization. The replication module 510 of the back up broker 204 is communicatively coupled to the recovery log 602 of the back up broker 204 and the message database 604 of the back up broker 204. The recovery log 602 and the message database 604 include all events, transaction and state of the back up broker 204 and in addition all events, transactions and state of primary broker 202. These are mirror copies of message database 522 and the recovery log 516 of the primary broker 202. The replication module 510 of the back up broker 204 store transactions or events and the database state in the recovery log 602 and the message database 604, respectively. For example, in one embodiment of the present invention, the replication module 510 of the back up broker 204 processes six types of events from the primary broker 202: 1) replicated events are logged on the backup broker 204, 2) in-memory events are non-logged informational events generated by the primary broker 202 to synchronize in-memory state, 3) database events that result in database add, delete and update operations on the backup broker 204, 4) operational events that utilize java reflection to execute logic on the backup broker 204, 5) fault tolerant events which represent commands executed on the primary broker 202 that need to be followed by the backup broker 204, 6) transaction events that represent messages that have been written to transaction files on the primary broker 202. The replication module 510 of back up broker 204 is able to communicate with the replication module 510 of the primary broker 202, and can receive transactions or events whether the replication module 510 of the primary broker 202 is operating in the mode of: 1) sending transaction immediately, 2) buffering transactions in a single recovery log 516, or 3) buffering transactions using the fast logging method described above. Essentially, the replication module 510 of back up broker 204 receives and accepts information regarding events, transactions and messages, modifies its state information based on the received information, but does not process the information because that is handled by the primary broker 202. Upon failure, the back up broker 204 can then continue but also processes the information.

The replication connection module 512 of the back up broker 512 performs similar functions as has been described above for the replication connection module 512 of the primary broker 202. The replication connection module 512 sets up a replication connection with the primary broker 202 for the back up broker 204. The replication connection module 512 manages and maintains a replication connection including definition and management of multiple replication connections in order to make use of multiple redundant network paths if available, but for the back up broker 204.

A fault-tolerant (FT) connection module 514 can be included in the back up broker 204. The fault-tolerant (FT) connection module 514 has similar functionality and coupling as has been described above, but for the back up broker 204. Since the back up broker 204 can also operate in the active mode upon failover, the fault-tolerant (FT) connection module 514 is used to establish fault-tolerant connections between the back up broker 204 and clients 210 of the primary broker 202 upon failover.

The memory 404b of the back up broker 20-4 includes one more configuration registers 518. These configuration registers identify the operational mode of the back up broker 204, the identity of the primary broker 202 that the back up broker is backing up, information for establishing a replication connection with the primary broker 202 and other conventional configuration information.

The recovery log of the back up broker 602 is a recovery log for storing transactions and events that mirrors the recovery log 516 of the primary broker 202. This recovery log of the back up broker 602 is preferably stores event and transactions replicated over by the primary broker 202. The replication module 510 maintains the recovery log 602 of the back up broker 204. The memory 404b of the back up broker 204 also include the message database 604. Again, this message database 604 is a mirror copy of the message database 522 of the primary broker 202 and is maintained by the replication module 510. Upon failure of the primary broker 202, the recovery log 602 and message database 604 are used to start the back up broker 204 with the same state as the primary broker 202 had before failure.

The recovery module 524 of the back up broker 204 performs similar functions as has been described above for the recovery module 524 of the primary broker 202. The recovery module 524 of the back up broker 512 is coupled for communication with the recovery log 602 and the message database 604 of the back up broker 204. Upon failure of the primary broker 202, the recovery module 524 can restore the back up broker 204 to the state of the primary broker 202 before it failed. Using the recovery log 602 of the back up broker 204 and the message database 604 of the back up broker 204, the back up broker 204 can be restored such that it continues the operations of the primary broker 202. These recovery operations are described in more detail below with reference to FIG. 12.

Client

Figure 7:
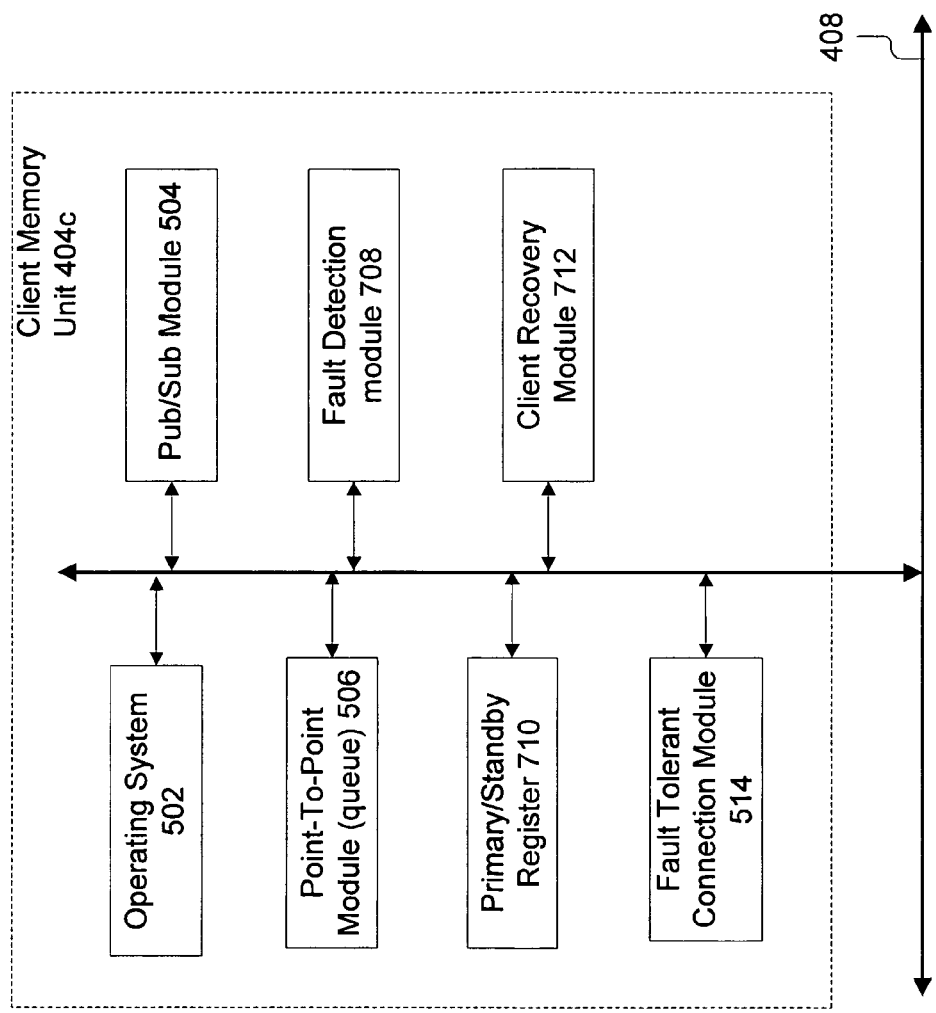
FIG. 7 is a block diagram of one embodiment of the memory for a client device according to the present invention.

Referring now to FIG. 7, a block diagram of one embodiment of the memory 404c for the client device 210 is shown. The memory 404c of the client 210 includes some functionality similar to the primary broker 202. Where appropriate for ease of understanding and clarity, like reference numerals and names have been used for like components having similar functionality to that of the primary broker 202 in the description below of the memory 404c for the client 210.

The memory 404c for the client 210 preferably comprises an operating system 502, a publish/subscribe module 504, a point-to-point module (queue) 506, a fault-tolerant (FT) connection module 514, a fault detection module 708, a primary/standby configuration register 710, and a client recovery module 712. The operating system 502, publish/subscribe module 504, point-to-point module 506, and a fault-tolerant connection module 514 have the same functionality as has been described above, but for the client 210.

The point-to-point module (queue) 506 is responsible for message queue type messaging and coupled to bus 408 for communication similar to that described above for the message queue of the primary broker 202 and the back up broker 204.

The client 210 uses the primary/standby configuration register 710 to store an identification number specifying the primary broker 202 and the back up broker 204. This identification information and connection information are provided so that the client 210 may connect to a primary broker 202, and in the event of failure, know which broker it should communicate with and how to make a connection to the back up broker 204.

The client 210 also includes a fault detection module 708. The fault detection module 708 provides the client 210 with the capability to detect a fault that will cause failover, and the client 210 to begin communication with the back up broker 204. This is particularly advantageous because there are multiple types of failure that may occur. A failure of the primary broker 202 will be known because the back up broker 204 is monitoring the primary broker through a replication connection. The fault detection module 708 of the client 210 detects when a connection to the primary broker 202 has failed, and works with the fault-tolerant (FT) connection module 514 to reconnect to the primary broker 202 before failing over to the back up broker 204. This process is detailed below with reference to FIG. 13. This feature is particularly advantageous because it makes the system 200 resistant to intermittent or transient network failures in the connection between the client 210 and the primary broker 202.

The client recovery module 712 works with the back up broker 204 to establish a connection to the back up broker 204 after failure of the primary broker 202. In particular, the client recovery module 712 communicates with the recovery module 524 of the back up broker 204. Upon failover, the client recovery module 712 communicates with the recovery module 524 so that the back up broker 204 can continue any messaging operation, transaction, or any other broker operation started by the primary broker before failure. This is particularly advantageous because it provides continuous availability and quality of service in the event of primary broker 202 failures.

Active and Standby Modes For Brokers

Figure 8:
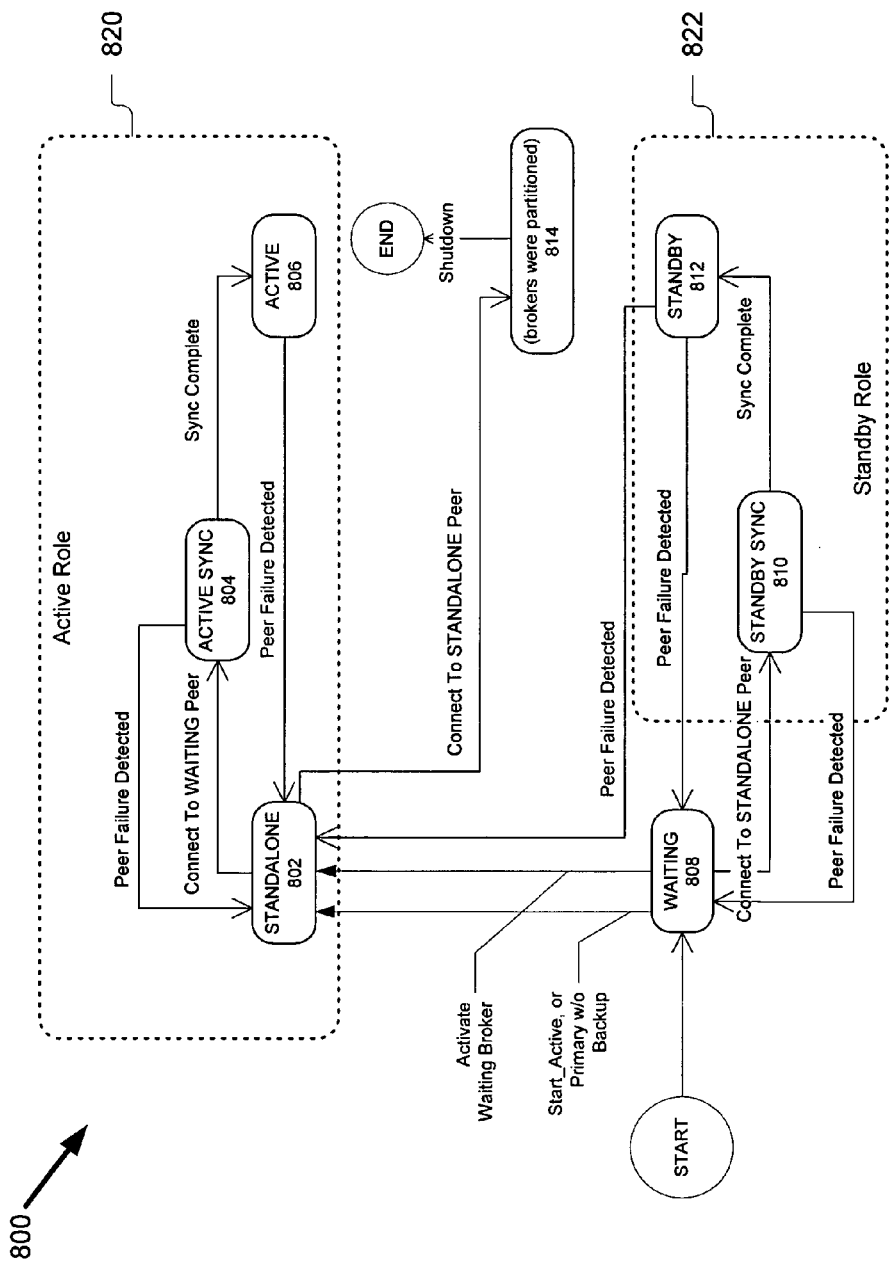
FIG. 8 is a state diagram showing one embodiment of various states and transitions for the primary broker and back up broker from start-up to shutdown.

FIG. 8 is a state diagram showing one embodiment of various states and transitions for the primary broker 202 and back up broker 204 from start-up to shutdown. The behavior of the broker (whether the primary broker 202 or the back up broker 204) through the sequence of events that may occur in the system 200 is controlled by the broker's replication state. A fault tolerant broker (whether the primary broker 202 or the back up broker 204) will cycle through a series of different phases during processing, synchronization and failure. A broker may be actively processing client operations while its back up is standing by waiting to take over in case of a failure; a broker may be active but running without the protection of a back up, or it may be in the process of synchronizing state with an active broker so that it can provide fault tolerance when synchronization is complete.

The states are grouped into two main "roles," the active role 820 and the standby role 822. The terms active and standby usually refer to the general role rather than the individual state, and indicate which of the brokers 202/204 is servicing operations from clients 210, and which one is not. As shown, while in the WAITING state 808 the broker 202/204 is not in either role—it is waiting to resolve its role.

WAITING State. Each broker 202/204 begins in the waiting state 808. In the waiting state 808, a broker is starting up and waiting to determine which role it should take. A primary or back up broker 202/204 is in the waiting state 808 at startup until it connects to the other broker to determine who has the most recent broker state. While in the waiting state 808, a broker does not accept connections from clients 210 or from other brokers in its cluster. By default, when a primary broker 202 and back up broker 204 are started, the first one to come up will go into the waiting state 808 until the second comes up and they establish a replication connection. Once in the waiting state 808, there are three ways to transition to another states. First, if a replication connection is established, and the other broker is in the standalone state 802, the broker will transition to the standby sync state 810 and begin runtime synchronization (Connect to STANDALONE Peer). Second, if a replication connection is established, and the other broker is also in the WAITING state, the brokers choose roles based on their previous role and synchronization state, and one broker of the two waiting broker is activated (Activate Waiting Broker). Third, a broker in the waiting state 808 may transition directly to stand alone state 802 in response to a setting for the broker to start iii the active role or to be a primary without a back up broker (Start_Active, or Primary s/o Back up).

STANDALONE state. In the STANDALONE state 802, the broker 202 is available to clients 210, but it is not connected to another broker 204 to which it can replicate. A failure of the broker 202 while in this state 802 will interrupt service, since there is no standby ready to fail over. Brokers not configured for fault tolerance are always in this state while running. A primary broker 202 is in the STANDALONE state if it is actively servicing client and cluster operations but no standby broker is running, or if a standby broker is running but is not in the STANDBY state. While in the STANDALONE state 802, if a replication connection is established, and the other broker is in the STANDALONE state, both brokers must have become active during a partition 814. The brokers may have performed inconsistent operations, and may have inconsistent state that cannot be resolved at runtime; if both brokers have accepted connections from clients or other brokers, both brokers will shut down. If only one broker has accepted connections while partitioned, that broker will remain in the standalone state and the other broker will shut down. If a replication connection is established, and the other broker is in the WAITING state 808, this broker will transition to the ACTIVE SYNC state, and begin the drive the runtime synchronization process while continuing to service clients. A primary broker with no configured back up (i.e. not configured for fault tolerance) transitions to the STANDALONE state 802 immediately on startup, and remains in this state indefinitely.

ACTIVE SYNC state. In the ACTIVE SYNC state 804, the broker 202 is driving the runtime synchronization process from the active role 820, to update the state of the standby, while also servicing client operations. If the both brokers connected while in the WAITING state, and they were storage-synchronized prior to starting up, runtime synchronization is trivial and completes immediately. While in this ACTIVE SYNC state 804, completion of the runtime synchronization protocol (Sync Complete) causes a transition to the ACTIVE state 806. While in this ACTIVE SYNC state 804, the loss of all replication connections (Peer Failure Detected) indicates a failure of the standby broker, and this broker returns to the STANDALONE state 802.

ACTIVE state. A fault-tolerant broker is in the ACTIVE state 806 if it is actively servicing client and cluster operations, and it is replicating operations to a standby broker 204 that is currently in the STANDBY state 812. While in the ACTIVE state 806, a broker 202 is protected from failure since a standby broker 204 is present and ready to take over. While in this state, the failure of all replication connections (Peer Failure Detected) indicates a failure or partition from the other broker, and causes a transition to the STANDALONE state 802.

STANDBY SYNC state. In the STANDBY SYNC state 810, the broker 204 is undergoing runtime synchronization from the standby role 822, and its storage and memory state are being updated to reflect the state of the active broker 202.

When runtime synchronization completes (Sync Complete), the broker 204 transitions to the standby state 812. If the brokers 202, 204 are connected while still both in the WAITING state 808, and they were storage-synchronized prior to starting up, runtime synchronization is trivial and completes immediately. A broker in the STANDBY SYNC state 810 does not take over for an ACTIVE broker even if it detects a failure, since it does not have the context to continue client operations. While in this state, and all replication connections are lost (Peer Failure Detected), this cancels runtime synchronization and causes a transition back into the WAITING state 808.

STANDBY state. In the STANDBY state 812, the broker 204 has completed runtime synchronization; it is processing replication data "live" from the active; and it is ready to fail over to the active role if it detects a failure of the active broker. If a failure is detected (Peer Failure Detected) while in STANDBY mode 812, the broker 204 will switch its state to an ACTIVE role 820 and begin accepting failover connections as well as normal connections from new clients. While in this state, the loss of all replication connections (Peer Failure Detected) indicates a failure of the other broker, and causes a transition to the STANDALONE state 802. This is the transition usually referred to as broker failover. When an active broker fails, the standby broker becomes active as soon as it detects and confirms the failure, and it is ready to accept connections from any clients and cluster peer brokers that were connected to the previously active broker when it failed; any clients can continue operating without losing the context of operations that were pending when the previous broker failed.

Figure 9:
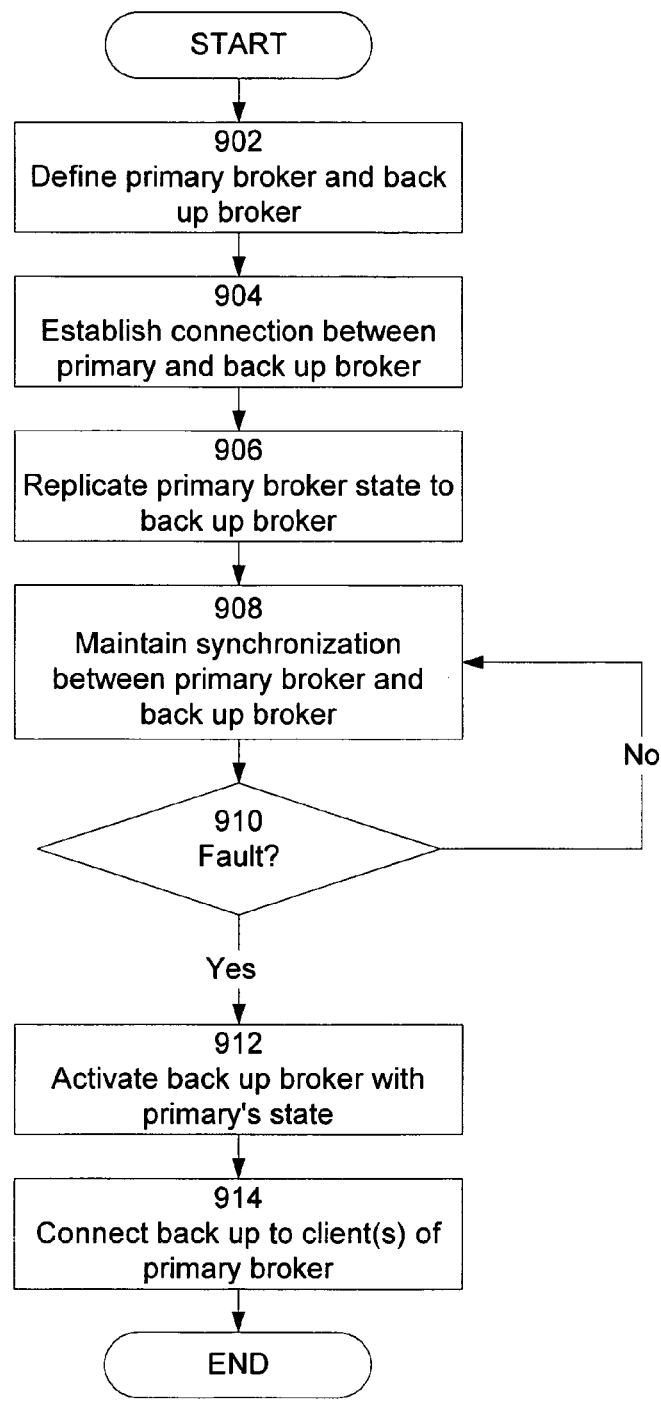
FIG. 9 is a flowchart of one embodiment of a method for performing fault tolerance according to the present invention.

Referring now to FIG. 9, the method for performing fault tolerance according to the present invention will be described. The method begins by defining 902 a primary broker 202 and a back up broker 204. The two brokers 202, 204 are set to take on those roles as has been defined above. Next, the method establishes 904 a replication connection between the primary broker 202 and the back up broker 204. Then the brokers 202, 204 replicate 906 the state of the primary broker to the back up broker 204. Once both the database state and the memory state have been replicated to the back up broker 204, synchronization is maintained 908 between the broker by sending messages, events and transactions from the primary broker 202 to the back up broker 204 using the replication connection. Next, the method tests 910 whether a fault has been detected. If not, the method returns to step 908 to maintain state. If a fault has been detected, the method activates 912 the back up broker 204 with the state of the primary broker 202, and finally, the back up broker connect to client's of the primary broker and continues with the processing such that the clients are unaffected by the failure of the primary broker 202.

Figure 10:
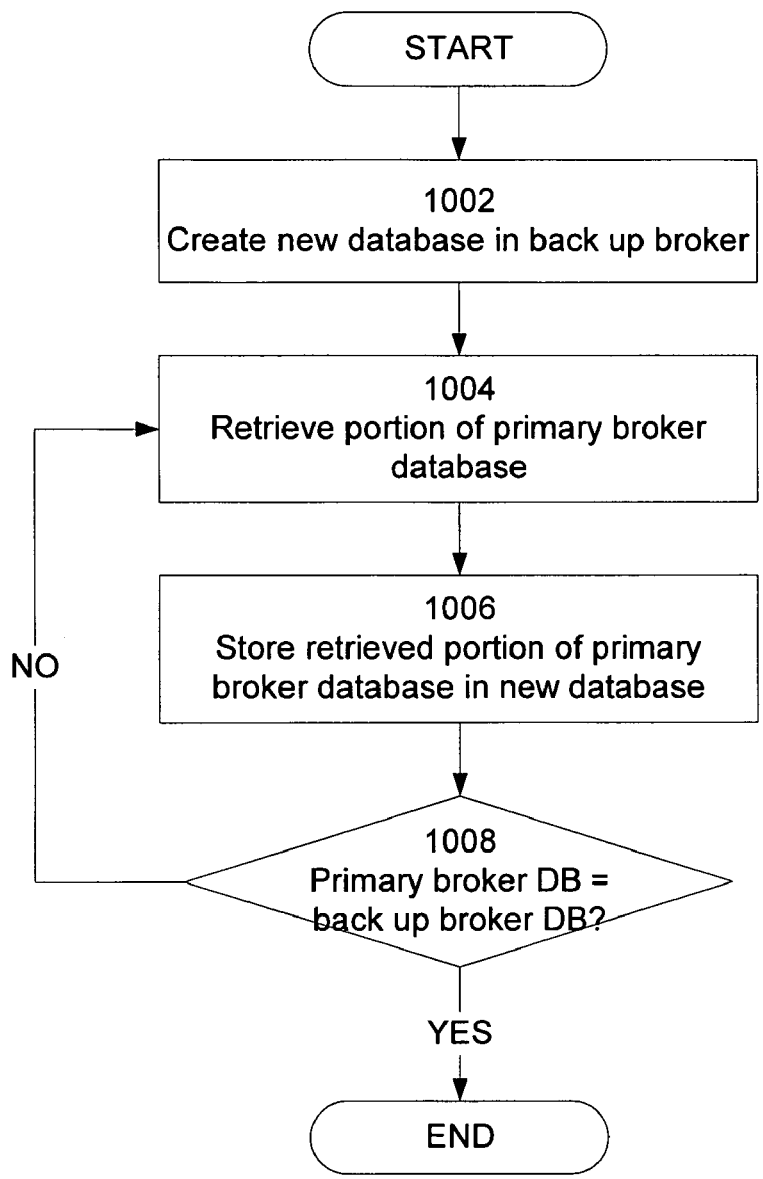
FIG. 10 is a flowchart of one embodiment of a method for dynamic synchronization between a primary broker and a back up broker according to the present invention

Referring now to FIG. 10, one embodiment of a method for replication of broker state from the primary broker 202 to the back up broker 240 will be described. The method begins by creating 1002 a new database 604 in the back up broker 204. Then a portion of the primary broker message database 522 is retrieved 1004. The retrieve portion of the primary broker database 522 is then stored in the newly created database 604 on the back up broker 204. Then the method determines whether the new database 604 in the back up broker 204 is identical to the message database 522 of the primary broker 202. If not, the method returns to repetitively perform steps 1004, 1006 and 1008 until the database 604 in the back up broker 204 is identical to the message database 522 of the primary broker 202. If so, the database state has been replicated from the primary broker 202 to the back up broker 204 and the method is complete and end.

Figure 11:
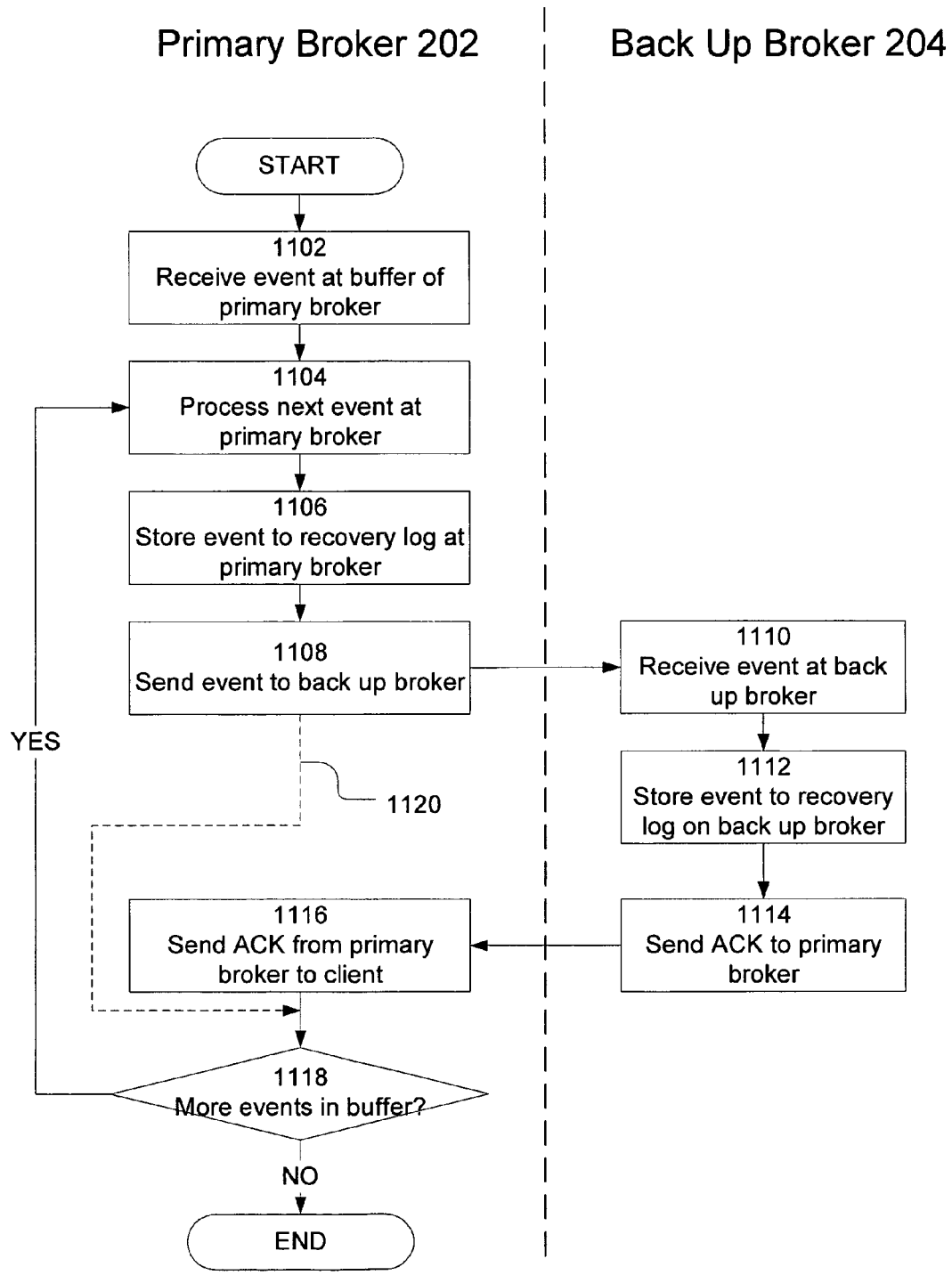
FIG. 11 is a flowchart for one embodiment of a method for maintaining or synchronizing the state of a primary broker and a back up broker according to the present invention.

FIG. 11 shows a method for synchronizing the state of a primary broker and a back up broker using a log. The process begins with one or more events being received at the primary broker 202 and stored in a temporary buffer. Then the first event in the buffer or queue is processed 1104. Once the event has been processed, the event is stored in the recover log 516 of the first broker 202. Next the event is sent from the primary broker 202 to the back up broker 204. Those skilled in the art will recognize that event could be sent to the back up broker immediately before step 1104 and 1106, or the order of these steps may be in various forms. The event is received 1110 at the back up broker 204, and then the event is stored in the recover log 602 of the back up broker 204 that maintains a copy of the state of the primary broker 202. Once the event has been stored a confirmation signal can be send back to the primary broker 202. In this embodiment, the primary broker 202 waits until it has received confirmation that the event has been stored in the back up broker 204 before doing further event processing. Once the acknowledgement has been received by the primary broker, it can send 1116 an acknowledgement signal to the client 210. After that event has been processed, the method determines 1118 whether there are more events in the buffer that need to be processed. If so the method returns to step 1104 to retrieve the next event from the buffer and process it. If not the method is complete and ends.

In an alternate embodiment depicted in FIG. 11 by dotted line 1120, the method need not wait for acknowledgement that the back up broker has stored/logged the event. In such an embodiment, the method transitions from step 1108 to both steps 1110 and step 1118 in parallel. Moreover steps 1114 and 1116 of sending acknowledgement signals can be omitted.

Figure 12:
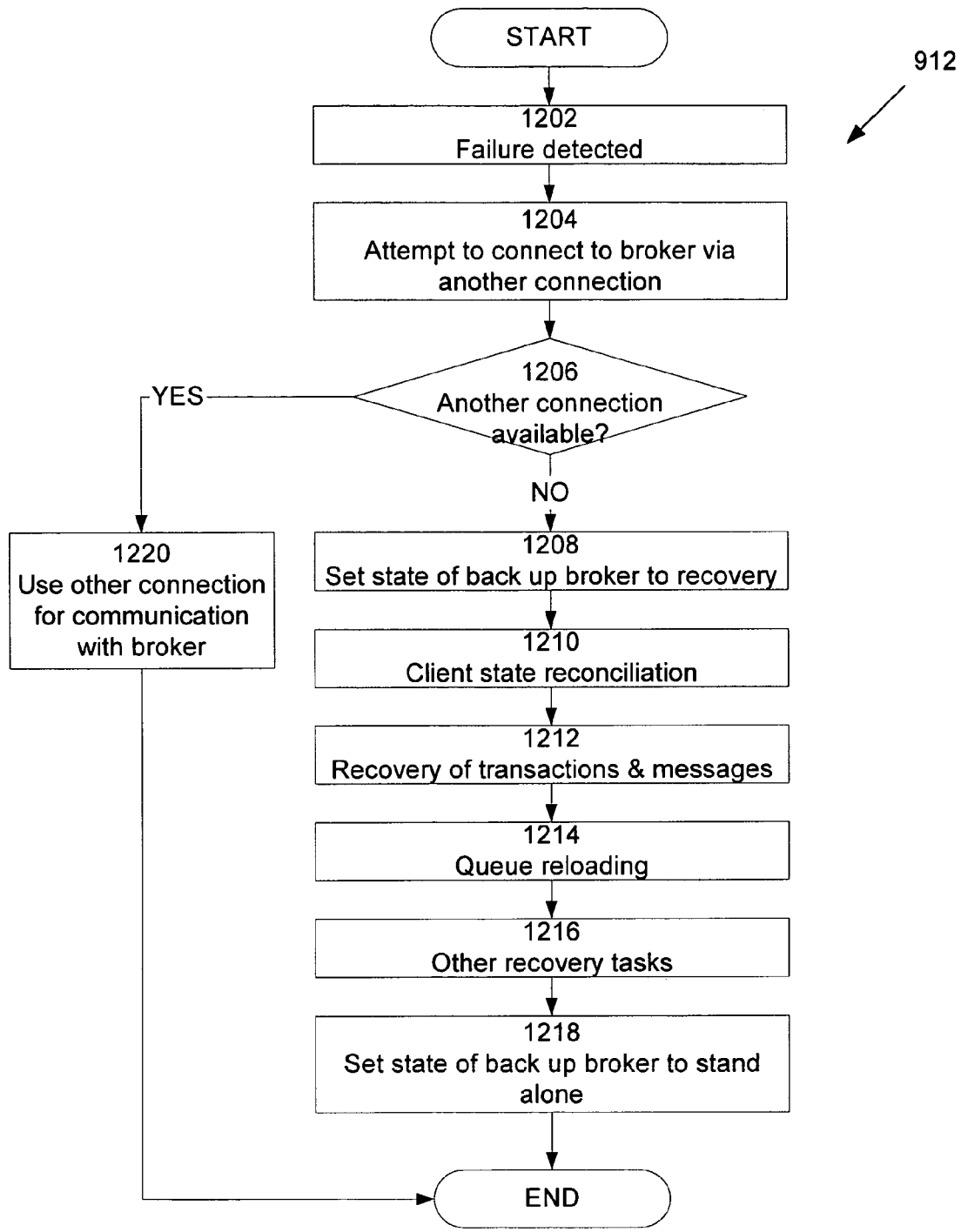
FIG. 12 is a flowchart for one embodiment of a method for performing recovery to a back up broker after a failure according to the present invention.

Referring now to FIG. 12, a method for performing recovery to a back up broker after a failure is described. The recovery method begins by detecting 1202 a failure. The method assumes that it may be a connection failure as opposed to a broker failure and first tries to reestablish a connection using another path. In step 1204, the method attempts to reconnect to the primary broker 202 using another connection. The method determines 1206 whether another connection is available. If so, the method uses 1220 the other connection for communication with broker 202 and the recovery is complete. If in step 1206 another connection is not available, this likely indicates a broker failure. The method next sets 1208 the state of the back up broker 204 to recovery. Then the back up broker 204 performs client state reconciliation. This is preferably done on a per client 210 basis as the connection requests come across for connection to the back up broker 204. Then the method recovers 1212 transactions, messages and events from the recover log 602. The back up broker 204 performs queue reloading based on information from the recovery log, and other recovery tasks 1216. Finally, the state of back up broker 204 is set to STANDALONE, the back up broker 204 actively services client operations, and recovery is complete.

Figure 13:
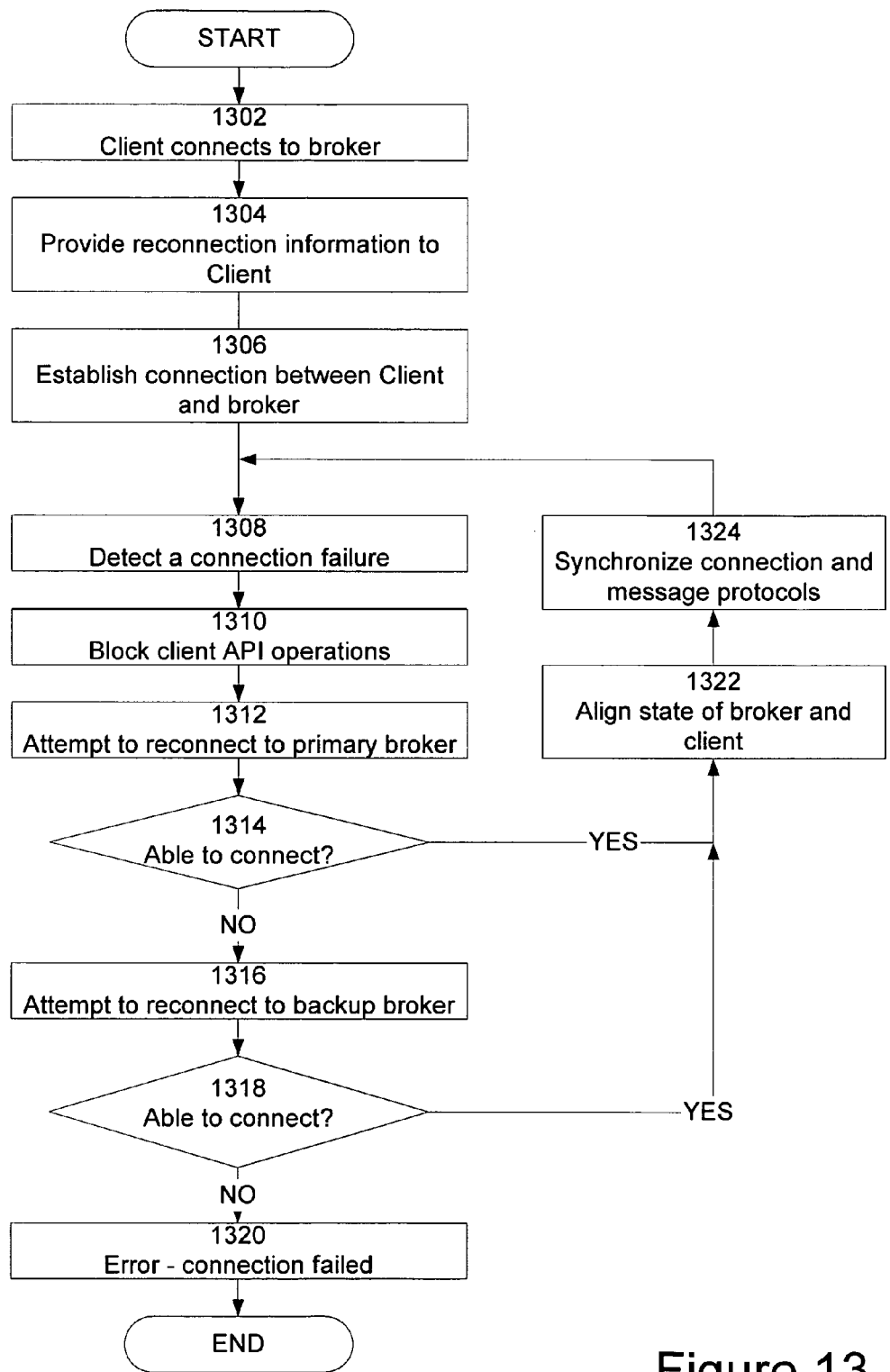
FIG. 13 is a flowchart of one embodiment of a method for operation of a fault-tolerant connection between a client and a broker in accordance with the present invention.
Figure 14:
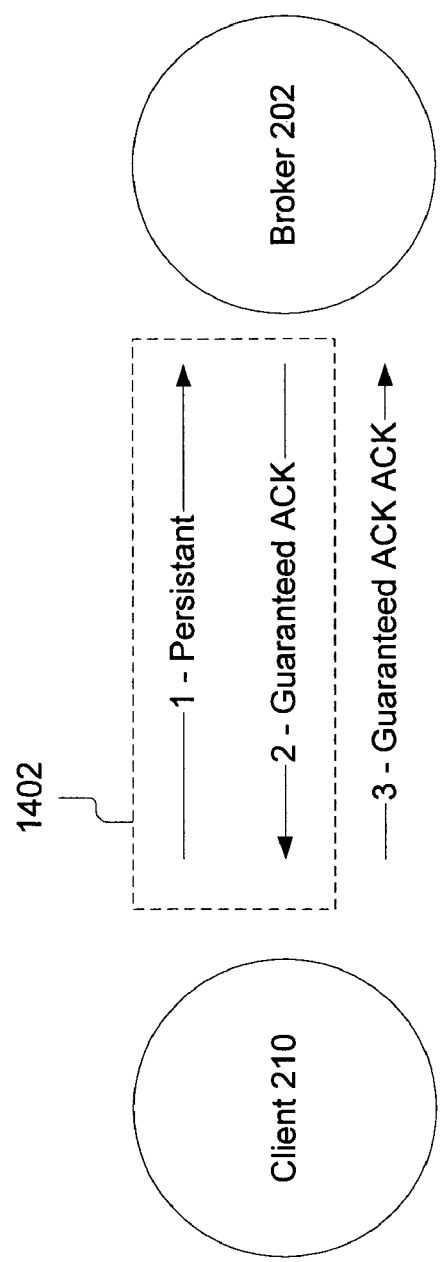
FIG. 14 is a graphical depiction block of a handshaking process between the broker and the client for a fault tolerant connection.

Referring now to FIG. 13, one embodiment for operation of a fault-tolerant connection between the client 210 and the broker 202/204 will be described. The method begins by establishing 1302 a normal connection between the client 210 and the broker 202. Next, the method provides 1304 reconnection information to the client 210. This information is used to re-establish a connection. In one embodiment, this information may be transmitted by the active broker which has knowledge of the standby broker's connection information, or the client may have its own reconnection information. Next, a fault tolerant connection is established between the client 210 and the primary broker 202. The method continues to use the connection, until a connection failure is detected 1308. Once a connection failure has been detected 1308, the method blocks 1310 the client 210 API operations, and then attempts 1312 to reconnect to the primary broker 202. Next the method determines 1314 whether the client 210 was able to reconnect to the primary broker 202. If the client 210 is able to reconnect, the method continues in step 1322 to align the state of the primary broker 202 and the client 210, and then synchronizes 1324 the connection and message protocols. After the connection has been re-established in step 1324, the method returns to step 1308 where it monitors for a connection failure.

On the other hand, if in step 1314 it is determined that the attempt to reconnect to the primary broker 202 was not successful, the method tries to connect 1316 with the back up broker 204. The method determines 1318 whether the client 210 was able to connect to the back up broker 204. If so, the method continues to perform steps 1322 and 1324 as has been described above, but for the back up broker 204 before returning to step 1308 and monitoring for a connection failure. If the client 210 was able to connect to the back up broker 204 in step 1316, the method proceeds from step 1318 to step 1320 where and error and connection failure are signaled before the method ends.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for providing messages on a fault tolerant basis, the method comprising the steps of:
    establishing a connection between a first broker and a second broker;
    replicating a state of the first broker to the second broker;
    maintaining dynamic run-time synchronization of the state of the first broker in an active state and the second broker in a standby state by (1) receiving a message from the first broker that includes a copy of transactions and events that comprise the state of the first broker and (2) storing, to a volatile memory of the second broker, the transactions and the events included in the message;
    recovering to the second broker upon a failure of the first broker using the transactions and events stored in the volatile memory of the second broker;
    bi-directionally connecting the first broker to at least one client, wherein the at least one client is configured to send messages to and receive messages from the first broker;
    wherein the step of connecting the first broker to at least one client comprises establishing a fault tolerant connection between the at least one client and the first broker that permits the at least one client to re-establish the connection to the first broker before failing over to the second broker,
    aligning the state of the first broker and the at least one client if an attempt to re-establish the connection was successful; and
    synchronizing connection and message protocols if the attempt to re-establish the connection was successful, and
    wherein the state of the first broker reflects messages sent and received by the first broker.

2. The method of claim 1, wherein the step of establishing the first broker in an active mode comprises the steps of:
    operating the first broker in a stand-alone mode;
    operating the first broker in a synchronization mode for replicating the state of the first broker to the second broker; and
    transitioning the first broker to the active state upon completion of synchronization.

3. The method of claim 1, wherein the step of establishing the second broker in the standby state comprises the steps of:
    operating the second broker in a synchronization mode for replicating the state of the first broker to the second broker; and
    transitioning the second broker to the standby state upon completion of synchronization.

4. The method of claim 1, further comprising the step of connecting the second broker to at least one client when in active mode.

5. The method of claim 1, wherein the step of establishing a fault tolerant connection, comprises the steps of:
    establishing a connection between the client and the first broker;
    providing reconnection information to the client; and
    detecting a failure of the connection between the client and the first broker.

6. The method of claim 5, further comprising the steps of:
    determining whether the attempt to re-establish the connection was successful;
    connecting to the second broker if the attempt was not successful.

7. The method of claim 1, wherein the step of establishing a connection between the first broker and the second broker comprises the steps of:
    establishing a first connection between the first broker and the second broker; and
    establishing a second connection between the first broker and the second broker.

8. The method of claim 7, wherein the first connection and the second connection between the first broker and the second broker are made over a private network.

9. The method of claim 1, wherein the step of replicating the state of the first broker to the second broker comprises the steps of:
creating a second broker database at the second broker;
retrieving a portion of a first broker database; and
storing the retrieved portion of the first broker database in the second broker database.

10. The method of claim 9, further comprising the steps of:
determining whether the first broker database is equivalent to the second broker database; and
repeating the steps of retrieving and storing if the first broker database is not equivalent to the second broker database.

11. The method of claim 1, wherein the step of maintaining synchronization comprises the steps of:
receiving an event at the first broker;
processing the event by the first broker;
storing the event at the first broker;
sending the event to the second broker; and
storing the event at the second broker.

12. The method of claim 11, comprising the steps of:
generating an acknowledgment signal by the second broker after the event has been stored at the second broker; and
sending the acknowledgement signal from the second broker to the first broker.

13. The method of claim 11, comprising the step of:
waiting for an acknowledgment signal at the first broker;
sending the acknowledgment signal from the first broker to a client.

14. The method of claim 1, wherein upon failure of the first broker, the second broker operates in a stand-alone mode.

15. The method of claim 1, further comprising the steps of:
attempting to connect to the first broker using another connection;
determining whether another connection is available; and
using the other connection to communicate with the first broker if another connection is available.

16. The method of claim 1, wherein the step of recovering to the second broker comprises the steps of:
reconciling a client state with a stored state at the second broker;
recovering transactions and events stored at the second broker; and
queuing reloading of recovered transactions and events.

17. A fault tolerant messaging system, the system comprising:
a first broker having an input and output for processing messages to and from a client, the first broker having a state reflecting the processing of messages and events, the first broker adapted to maintain dynamic run-time synchronization of the state of the first broker by transmitting a synchronization message that includes a copy of transactions and events that comprise the state of the first broker;
a second broker having an input and output for processing messages, the second broker adapted to receive and store the synchronization message in a volatile memory of the second broker, the second broker also adapted to use the stored synchronization message from the volatile memory of the second broker in recovering and communicating with the client upon failure of the first broker; and
a first bi-directional connection coupled to the first broker and the second broker, the first connection being used to send and receive state information; and
a fault tolerant connection between the first broker and at least one client, the fault tolerant connection permitting at least one client to re-establish the connection to the first broker before failing over to the second broker,
wherein the state of the first broker reflects messages sent and received by the first broker, and
wherein if an attempt to re-establish the connection between the first broker and the at least one client is successful, the first broker and the client are configured to align states and to synchronize connection and message protocols.

18. The fault tolerant messaging system of claim 17, further comprising a second connection coupled to the first broker and the second broker, the second connection being used to send and receive state information.

19. The fault tolerant messaging system of claim 18, wherein the first connection and the second connection are over a private network.

20. The fault tolerant messaging system of claim 18, comprising a third connection coupled to the first broker and the client for sending and receiving messages and events.

21. The fault tolerant messaging system of claim 19, further comprising a fourth connection coupled to the first broker and the client for sending and receiving messages and events.

22. The fault tolerant messaging system of claim 17, wherein the first broker comprises a message database for storing state information.

23. The fault tolerant messaging system of claim 17, wherein the first broker comprises a recovery log for storing events.

24. The fault tolerant messaging system of claim 17, wherein the second broker comprises a message database for storing state information.

25. The fault tolerant messaging system of claim 17, wherein the second broker comprises a recovery log for storing events.

26. The fault tolerant messaging system of claim 17, wherein the first broker comprises a replication module for sending events received at the first broker to the second broker.

27. The fault tolerant messaging system of claim 26, wherein the second broker comprises a replication module for receiving events from the replication module of the first broker, the replication module of the second broker storing events received in recovery log at the second broker.

28. The fault tolerant messaging system of claim 27, wherein the replication module processes events received from the first broker to maintain the state of the second broker.

29. The fault tolerant messaging system of claim 17, wherein the first broker comprises a replication connection module for establishing a replication connection between the first broker and the second broker.

30. The fault tolerant messaging system of claim 17, wherein the first broker comprises a transaction manager, the transaction manager tracking a status of a transaction, and keeping the transaction open until complete.

31. The fault tolerant messaging system of claim 30, wherein the second broker comprises a transaction manager, the transaction manager of the second broker tracking status of transactions, the transaction manager of the second broker coupled for communication with the transaction manager of the first broker such that the transaction manager of the second broker tracks the transactions processed by the first broker.

32. The fault tolerant messaging system of claim 17, wherein the second broker comprises a recovery module, the recovery module responsive to the failure of the first broker, the recovery module of the second broker for making the second broker operational with the state of the first broker upon the failure of the first broker.

33. The fault tolerant messaging system of claim 32, wherein the failure of the first broker includes an inability to connect to the first broker by the client.

34. The fault tolerant messaging system of claim 17, wherein the client includes a fault detection module for detecting the failure of the first broker.

35. The fault tolerant messaging system of claim 17, comprising a third broker having an input and output for processing messages, the third broker adapted to receive and store the state of the first broker, the third broker communicating with the client upon failure of the first broker and the second broker.

36. The fault tolerant messaging system of claim 17 wherein the first broker, second broker, and a third broker simultaneously serve different clients,
- the first broker configured to receive and store a state of the third broker in a volatile memory of the first broker, the first broker also configured to use information from the volatile memory of the first broker in recovering and communicating with a client of the third broker upon failure of the third broker; and
- the third broker configured to receive and store a state of the second broker in a volatile memory of the third broker, the third broker also configured to use information from the volatile memory of the third broker in recovering and communicating with a client of the second broker upon failure of the second broker.

* * * * *